(12) United States Patent
Linford et al.

(10) Patent No.: US 8,658,039 B2
(45) Date of Patent: Feb. 25, 2014

(54) SONICATION FOR IMPROVED PARTICLE SIZE DISTRIBUTION OF CORE-SHELL PARTICLES

(75) Inventors: Matthew R. Linford, Orem, UT (US); Chuan-Hsi Hung, Provo, UT (US)

(73) Assignee: Brigham Young University, Provo, UT (US)

( * ) Notice: Subject to any disclaimer, the term of this patent is extended or adjusted under 35 U.S.C. 154(b) by 216 days.

(21) Appl. No.: 13/297,052

(22) Filed: Nov. 15, 2011

(65) Prior Publication Data

US 2012/0145623 A1 Jun. 14, 2012

Related U.S. Application Data

(60) Provisional application No. 61/458,068, filed on Nov. 17, 2010.

(51) Int. Cl.
*B01D 15/08* (2006.01)

(52) U.S. Cl.
USPC ..... 210/656; 210/635; 210/198.2; 210/502.1; 502/439

(58) Field of Classification Search
USPC .................. 210/635, 656, 659, 198.2, 502.1; 502/439
See application file for complete search history.

(56) References Cited

U.S. PATENT DOCUMENTS

| | | | |
|---|---|---|---|
| 3,345,804 A | 10/1967 | Mariani et al. | |
| 3,455,841 A | 7/1969 | Mariani et al. | |
| 3,499,046 A | 3/1970 | Wall et al. | |
| 3,505,785 A | 4/1970 | Kirkland | |
| 3,577,266 A | 5/1971 | Kirkland | |
| 3,782,075 A | 1/1974 | Kirkland | |
| 3,907,985 A | 9/1975 | Rankin | |
| 4,010,242 A | 3/1977 | Iler et al. | |
| 4,029,583 A | 6/1977 | Ho Chang et al. | |
| 4,070,283 A | 1/1978 | Kirkland | |
| 4,101,460 A | 7/1978 | Small et al. | |
| 4,225,463 A | 9/1980 | Unger et al. | |
| 4,298,500 A | 11/1981 | Abbott | |

(Continued)

FOREIGN PATENT DOCUMENTS

| | | |
|---|---|---|
| EP | 0306331 | 3/1989 |
| GB | 1236761 | 6/1971 |

(Continued)

OTHER PUBLICATIONS

U.S. Appl. No. 12/774,777, Feb. 26, 2013, Office Action.

(Continued)

*Primary Examiner* — Ernest G Therkorn
(74) *Attorney, Agent, or Firm* — Dorsey & Whitney LLP

(57) ABSTRACT

In one or more embodiments, a porous composite particulate material includes a plurality of composite particles including an acid-base-resistant core particle at least partially surrounded by one or more layers of acid-base-resistant shell particles. The shell particles are adhered to the core particle by a polymeric material. The shell particles and/or core particles may be made from an acid-base-resistant material that is stable in harsh chemical conditions. During application of the polymeric material/shell particle bilayer, the core particles are sonicated to homogenize the particle size distribution and minimize agglomeration of particles. Multiple bilayers of polymer/shell particles may be applied. In one embodiment, the core particle comprises generally spherical glassy carbon, while the shell particles may comprise nano-sized diamond particles. Other acid-base-resistant materials may be employed. The porous composite particulate materials may be used in separation technologies, including, but not limited to, chromatography and solid phase extraction.

17 Claims, 24 Drawing Sheets

(56) References Cited

U.S. PATENT DOCUMENTS

| | | | |
|---|---|---|---|
| 4,431,546 | A | 2/1984 | Hughes et al. |
| 4,438,070 | A | 3/1984 | Stephens et al. |
| 4,519,905 | A | 5/1985 | Stevens et al. |
| 4,571,306 | A | 2/1986 | Kozak |
| 4,705,725 | A | 11/1987 | Glajch et al. |
| 4,913,935 | A | 4/1990 | Lin |
| 5,114,577 | A | 5/1992 | Kusano et al. |
| 5,154,822 | A | 10/1992 | Simpson et al. |
| 5,205,929 | A | 4/1993 | Carr et al. |
| 5,270,280 | A | 12/1993 | Ichikawa et al. |
| 5,308,481 | A | 5/1994 | Stalling et al. |
| 5,403,477 | A | 4/1995 | Del Mar |
| 5,429,708 | A | 7/1995 | Linford et al. |
| 5,487,831 | A | 1/1996 | Pirkle et al. |
| 5,653,875 | A | 8/1997 | Betz et al. |
| 5,705,222 | A | 1/1998 | Somasundaran et al. |
| 6,056,877 | A | 5/2000 | Gjerde et al. |
| 6,071,410 | A | 6/2000 | Nau et al. |
| 6,372,002 | B1 | 4/2002 | D'Evelyn et al. |
| 6,406,776 | B1 | 6/2002 | D'Evelyn |
| 6,488,855 | B2 | 12/2002 | Gjerde et al. |
| 6,607,908 | B1 | 8/2003 | Tanga et al. |
| 7,091,271 | B2 | 8/2006 | James et al. |
| 7,118,725 | B2 | 10/2006 | Reinheimer et al. |
| 7,125,945 | B2 | 10/2006 | Shah |
| 7,225,079 | B2 | 5/2007 | Gjerde et al. |
| 7,311,838 | B2 | 12/2007 | Herold et al. |
| 7,326,837 | B2 | 2/2008 | Han et al. |
| 7,427,361 | B2 | 9/2008 | Small et al. |
| 7,622,045 | B2 | 11/2009 | Vane et al. |
| 7,846,337 | B2 | 12/2010 | Chen et al. |
| 8,389,584 | B2 | 3/2013 | Petrov et al. |
| 2004/0035787 | A1 | 2/2004 | Tanga et al. |
| 2004/0118762 | A1 | 6/2004 | Xu et al. |
| 2004/0121070 | A1 | 6/2004 | Xu et al. |
| 2004/0202603 | A1 | 10/2004 | Fischer et al. |
| 2004/0223900 | A1 | 11/2004 | Khabashesku et al. |
| 2005/0000900 | A1 | 1/2005 | Huang et al. |
| 2005/0029196 | A1 | 2/2005 | Rhemrev-Boom |
| 2005/0076581 | A1 | 4/2005 | Small et al. |
| 2005/0189279 | A1 | 9/2005 | Xu et al. |
| 2005/0269467 | A1 | 12/2005 | Balelo et al. |
| 2006/0024434 | A1 | 2/2006 | Wang et al. |
| 2006/0154304 | A1 | 7/2006 | Han et al. |
| 2006/0234269 | A1 | 10/2006 | Asplund et al. |
| 2006/0269467 | A1 | 11/2006 | Khabashesku et al. |
| 2007/0189944 | A1 | 8/2007 | Kirkland |
| 2008/0025905 | A1 | 1/2008 | Wang et al. |
| 2008/0028839 | A1 | 2/2008 | Vail |
| 2008/0277346 | A1 | 11/2008 | Kirkland et al. |
| 2009/0104361 | A1 | 4/2009 | Ma et al. |
| 2009/0194481 | A1 | 8/2009 | Yilmaz et al. |
| 2009/0218276 | A1 | 9/2009 | Linford et al. |
| 2009/0218287 | A1 | 9/2009 | Vail et al. |
| 2009/0221773 | A1 | 9/2009 | Linford et al. |
| 2009/0277839 | A1 | 11/2009 | Linford |
| 2010/0069567 | A1 | 3/2010 | Petrov et al. |
| 2010/0072137 | A1 | 3/2010 | Linford et al. |
| 2010/0213131 | A1 | 8/2010 | Linford |
| 2011/0049056 | A1 | 3/2011 | Wyndham et al. |
| 2011/0210056 | A1 | 9/2011 | Linford et al. |

FOREIGN PATENT DOCUMENTS

| | | |
|---|---|---|
| GB | 2412370 | 9/2005 |
| JP | 62061632 | 3/1987 |
| JP | 2004-51937 | 2/2004 |
| SU | 858909 | 8/1981 |
| WO | WO 2007095158 | 8/2007 |
| WO | WO 2008/097343 | 8/2008 |
| WO | WO 2009140207 | 11/2009 |
| WO | WO 2010/033903 | 3/2010 |
| WO | WO 2011/106685 | 9/2011 |

OTHER PUBLICATIONS

U.S. Appl. No. 12/463,899, filed May 11, 2009, Linford.
U.S. Appl. No. 12/744,777, filed May 6, 2010, Linford.
U.S. Appl. No. 12/039,382, filed Feb. 28, 2008, Linford et al.
U.S. Appl. No. 12/040,638, filed Feb. 29, 2008, Linford et al.
MAC-MOD Analytical,Inc., "Fused-Core particle technology for hyper-fast and super-rugged HPLC Columns", HALO, 8 pages, Chadds Ford, United States, www.mac-mod.com.
Sigma-Aldrich, "Supelco Introduces Ascentis Express HPLC Columns for High Speed and High Efficiency Separations," NewsRelease, Feb. 20, 2007, 2 pages, St. Louis, United States, www.sigma-aldrich.com.
MAC-MOD Analytical, Inc., "New Fused-Core Particle Technology for Very Fast HPLC Separations," Technical Report, 2 pages, Chadds Ford, United States, www.mac-mod.com.
K. Zhang, J.Y. Lim, H.J. Choi and Y. Seo, "Core-Shell structured carbon nanotube/poly (methyl methacrylate) composite and its electrorheological characteristics," ScienceDirect, Diamond and Related Materials, vol. 17, Issues 7-10, Jul.-Oct. 2008, 2pages.
J.H. Moon; S. Yang, W. Dong, J.W. Perry, A. Adibi and S.M. Yang, "Core-shell diamond-like silicon photonic crystals from 3D polymer templates created by holographic lithography," Departmental Papers, Optics Express, vol. 14, Issue 13, Jun. 2006, 7 pages, http//repository.upenn.edu/mse_papers/89.
International Search Report and Written Opinion dated Oct. 27, 2009 as issued in International Application No. PCT/US2009/043483 filed May 11, 2009.
International Search Report and Written Opinion dated Aug. 30, 2011 as issued in International Application No. PCT/US2011/035306 filed May 5, 2011.
Gaurav Saini et al., "Core Shell Diamond as a Support for Solid-Phase Extraction and High-Performance Liquid Chromatography", Analytical Chemistry, vol. 82, No. 11, Jun. 1, 2010.
Yushin, G.N., et al., Effect of Sintering on Structure of Nanodiamond, Science Direct, 2005, 14, pp. 1721-1729 (9 pages).
Carbonnier et al., Coating of Porous Silica Beads by in Situ Polymerization/Crosslinking of 2-Hydroxypropyl Beta-Cyclodextrin Fro Reversed-Phase High Performance Liquid Chromatography Applications. Journal of Applied Polymer Science, vol. 91, pp. 1419-1426, 2004 (8 pages).
Crini et al., Separation of Structural Isomers Using Cyclodextrin-Polymers Coated on Silica Beads. Chromatographia, vol. 40, No. 5/6, pp. 296-302, 1995 (7 pages).
Liu, Yanshen, Investigation of Novel Microseparation Techniques, Department of Chemistry and Biochemistry, Brigham Young University, Aug. 2007 (180 pgs.).
Hamers, R.J. et al., Molecular and Biomolecular Monolayers on Diamond as an Interface to Biology. Diamond and Related Materials, 2005, 14, pp. 661-668.
Krysinski, P., Covalent Adlayer Growth on a Diamond Thin Film Surface. J. Am. Chem. Soc. 2003, 125, 12726-12728.
Clare, T.L. et al., Functional Monolayers for Improved Resistance to Protein Adsorption: Oligo(ethylene glycol)—Modified Silicon and Diamnd Surfaces. Langmuir, 2005, 21, 6344-6355.
Yang, W., et al., Interfacial Electrical Properties of DNA-Modified Diamond Thin Films: Intrinsic Response and Hybridization-Induced Field Effects. Langmuir, 2004, 20, 6778-6787.
Knickerbocker, T., et al., DNA-Modified Diamond Surfaces. Langmuir, 2003, 19, 1938-1942.
Ando, T. et al., Chemical Modification of Diamond Surfaces Using a Chlorinated Surface as an Intermediate State. Diamond and Related Materials, 1996, 5, (10), 1136-1142.
Miller, J.B., et al., Photochemical Modification of Diamond Surfaces. Langmuir, 1996, 12, 5809-5817.
Liu, Y. et al., Functionalization of Nanoscale Diamond Powder: Fluoro-, Alkyl-, Amino-, and Amino Acid-Nanodiamond Derivatives. Chem. Mater. 2004, 16, 3924-3930.
Ando, T. et al., Thermal Hydrogenation of Diamond Surfaces Studied by Diffuse Reflectance Fourier-Transform Infrared, Temperature-Programmed Desorption and Laser Raman Spectroscopy. Journal of the Chemical Society, Faraday Transactions, 1993, 89, 1783-1789.

(56) References Cited

OTHER PUBLICATIONS

Jiang, T., et al., FTIR Studies on the Spectral Changes of the Surface Functional Groups of Ultradispersed Diamond Powder Synthesized by Explosive Detonation After Treatment in Hydrogen, Nitrogen, Methane and Air at Different Temperatures. Journal of the Chemical Society, Faraday Transactions, 1996, 92, 3401-3406.

Tse, K.Y., et al., Electrical Properties of Diamond Surfaces Functionalized with Molecular Monolayers, Journal of Physical Chemistry B 2005, 109, 8523-8532.

Wang, S., et al., Spatially Heterogeneous Electrical and Electrochemical Properties of Hydrogen-Terminated Boron-Doped Nanocrystalline Diamond Thin Film Deposidted from an Argon-Rich CH4/H2/Ar/B2H6 Source Gas Mixture. J. Phys. Chem. C. 2007, 111, 3986-3995.

Kondo, T., et al., Fabrication of Covalent SAM/Au Nanoparticle/Boron-Doped Diamond Configurations with a Sequential Self-Assembly Method. Phys. Chem. C. 2007, 111, 12650-12657.

Strother, T., et al., Photochemical Functionalization of Diamond Films. Langmuir 2002, 18, 968-971.

Wang, G. T., et al., Functionalization of Diamond(100) by Diesl—Alder Chemistry. Journal of the American Chemical Society 2000, 122, 744-745.

Hahn, M., et al., Plasma modification of diamond surfaces. Journal of Adhesion Science and Technology 2005, 19, 1039-1052.

Scruggs, B.E., et al., Analysis of Fluorocarbon Plasma-Treated Diamond Powders by Solid_State Fluorine-19 Nuclear Magnetic Resonance. Journal of Physical Chemistry 1993, 97, 9187-9195.

Visbal, H. et al., Ultrasonic Treatment of Acid-Washed Diamond Powder Surface. Journal of the Ceramic Society of Japan 2004, 112, 95-98.

Notsu, H., et al., Introduction of Oxygen-Containing Functional Groups onto Diamond Electrode Surfaces by Oxygen Plasma and Anodic Polarization. Electrochem. Solid-State Lett. 1999, 2, 522-524.

Ohta, R., et al., Organosilane Self-Assembled Monolayers Directly Linked to the Diamond Surfaces. Vac. Sci. Technol. A 2004, 22, 2005-2009.

Nichols, B.M., et al., Photochemical Functionalization of Hydrogen-Terminated Diamond Surfaces: A Structural and Mechanistic Study. Journal of Physical Chemistry B 2005, 109, 20938-20947.

Nakamura, T. et al., ChemicalModification of Diamond Powder Using Photolysis of Perfluoroazooctane. Chemical Communications (Cambridge, England) 2003, 7, 900-901.

Lasseter, T.L., et al., Covalently Modified Silicon and Diamond Surfaces: Resistance to Nonspecific Protein Adsorption and Optimization for Biosensing. Journal of the American Chemical Society 2004, 126, 10220-10221.

Nakamura, T. et al., Photochemical Modification of Diamond Films: Introduction of Perfluorooctyl Functional Groups on Their Surface. Langmuir 2004, 20, 5846-5849.

Tsubota, T., et al., Abstraction of Hydrogen Atoms on Diamond Surface using Benzoyl Peroxide as a Radical Initiator. Diamond and Related Materials 2002, 11, 1374-1378.

Tsubota, T., et al., Chemical Modification of Hydrogenated Diamond Surface Using Benzoyl Peroxides. Physical Chemistry Chemical Physics 2002, 4, 806-811.

Ida, S., et al., Chemical Reaction of Hydrogenated Diamond Surface with Peroxide Radical Initiators. Diamond and Related Materials 2003, 12, 601-05.

Tsubota, T., et al., Chemical Modification of Diamond Surface Using a Diacyl Peroxide as Radical Initiator and CN group-containing Compounds for the Introduction of the CN group. Physical Chemistry Chemical Physics 2002, 4, 3881-3886.

Ida, S., et al., Chemical Modification of the Diamond Surface Using Benzoyl Peroxide and Dicarboxylic Acids. Langmuir 2003, 19, 9693-9698.

Tsubota, T., et al., Chemical Modification of Diamond Surface with Various Carboxylic Acids by Radical Reaction in Liquid Phase. Diamond and Related Materials 2004, 13, 1093-1097.

Tsubota, T., et al., Chemical Modification of Diamond Surface with CH3 (CH2)COOH using Benzoyl Peroxide. Physical Chemistry Chemical Physics 2003, 5, 1474-1480.

Linford, M.R., et al., Alkyl Monolayers Covalently Bonded to Silicon Surfaces. Jounal of the American Chemical Society 1993, 115, 12631-12632.

Linford, M.R., et al., Alkyl Monolayers on Silicon Prepared from 1-Alkenes and Hydrogen-Terminated Silicon. Journal of the American Chemical Society 1995, 117, 3145-3155.

Kim, N.Y., et al., Improved Polypyrrole/Silicon Junctions by Surfacial Modification of Hydrogen-Terminated Silicon Using Organolithium Reagents. J. Am. Chem. Soc. 1999, 121, 7162.

Vermeir, I.E., et al., Electrical Properties of Covalently Linked Silicon/Polypyrrole Junctions. Appl. Phys. Lett. 1999, 74, 3860.

Fabre, B., et al., Functionalization of Si(111) surfaces with alkyl chains terminated by electrochemically polymerizable thienyl units. Chem. Commun. 2002, 2904-2905.

Fabre, B., et al., Photoelectrochemical Generation of Electronically Conducting Polymer-Based Hybrid Junctions on Modified Si(111) Surfaces. J. Phys. Chem. B. 2003, 107, 14326-14335.

Fu, G.D., et al., Deposition of Nanostructured Fluoropolymer Films on Silicon Substrates via Plasma Polymerization of Allylpentafluorobenzene. J. Phys. Chem. B. 2003, 107, 13902-13910.

Cicero, R.L., et al., Olefin Additions on H-Si(111): Evidence for a Surface Chain Reaction Initiated at Isolated Dangling Bonds. Langmuir 2002, 18, 305-307.

Cicero, R.L., et al., Photoreactivity of Unsaturated Compounds with Hydrogen-Terminated Silicon (111)Langmuir 2000, 16, 5688-5695.

Tillman, N., et al., Incorporation of Phenoxy Groups in Self-Assembled Monalayers of Trichlorosilane Derivatives: Effects on Film Thickness, Wettability, and Molecular Orientation. J.Am.chem.Soc. 1988, 110, 6136-6144.

Lee, M.V., et al., Nanografting of Silanes on Silicon Dioxide with Applications to DNA Localization and Copper Electroless Deposition. Chem. Mater. 2007, 19, 5052-5054.

Chan, K., et al., Initiated CVD of Poly(methyl methacrylate) Thin Films. Chem. Vap. Deposition 2005, 11, 437-443.

Nesterenko, P.N., et al., Microdispersed sintered nanodiamonds as a new stationary phase for high-performance liquid chromatography. Analyst 2007, 132, 403-405.

Nesterenko, P.N., et al., Ion chromatographic investigation of the ion-exchange properties of microdisperese sintered nanodiamonds. Chromatogr., A 2007, 1155, 2-7.

Dyer, M.A., Protein Adhesion on Silicon-Supported Hyperbranched Poly(ethylene glycol) and Poly(allylamine) Thin Films. Langmuir 2007, 23, 7018-7023.

Sabu, S., et al., Peptide analysis: Solid phase extraction-elution on diamond combined with atmospheric pressure matrix-assited laser desorption/ionization-Fourier transform ion cyclotron resonance mass spectrometry. Anal. Biochem. 2007, 367, 190-200.

Chen, W.H., et al., Solid-Phase Extraction and Elution on Diamond (SPEED): A Fast and General Platform for Proteome Analysis with Mass SpectrometryAnal. Chem. 2006, 78, 4228-4234.

Kong, X.L., et al., Polylysine-Coated Diamond Nanocrystals for MALDI-TOF Mass Analysis of DNA Oligonucleotides, Anal. Chem. 2005, 77, 4273-4277.

Kalunzny, M.A., et al., J. Lipid, Rapid separation of lipd classes in high yield and purity using bonded phase columns, 1985, 26, 135-140.

Bateman, H. G., et al., Method for Extraction and Separation by Solid Phase Extraction of Neutral Lipid, Free Fatty Acids, and Polar Lipid from Mixed Microbial Cultures. J. Agric. Food Chem. 1997, 45, 132-134.

Bodennec, J. et al., Journal of Lipid Research. A procedure for fractionation of sphingolipid classes by solid-phase extraction on aminopropyl cartridges. 2000, 41, 1524-1531.

Akesson-Nilsson, G.J., Isolation of Chlorinated Fatty Acid Methyl Esters Derived from Cell-Culture Medium and From Fish Lipids by Using an Aminopropyl Solid-Phase Extraction Column. Chromatogr., A 2003, 996, 173-180.

(56) References Cited

OTHER PUBLICATIONS

Ushizawa, K., et al., Covalent Immobilization of DNA on Diamond and it's Verification by Diffuse Refelctance Infrared Spectroscopy. Chem. Phys. Lett. 2002, 351, 105-108.
Harris et al. Synthetis of Passivating, Nylon-Like Coatings through Cross-Linking of Ultrathin Polyelectrolyte Filsm. J. Am. Chem. Soc. 1999, 121, 1978-1979.
Zhang, J. et al., FTIR Spectroscopic Evidence for the Involvement of an Acidic Residue in Quinone Binding in Cytochrome bd from *Escherichia coli*.Biochemistry 2002, 41, 4612-4617.
Decker, C., The Use of UV Irradiation in Polymerization, Polymer International, vol. 45, No. 2, 1998, pp. 133-141 (9pgs).
Pascault et al., Thermosetting Polymers: Introduction. Marcel Dekker, Inc. NY, NY. 2002. 6 pages.
Buehler Sum-Met—Buehler Sum-met The Science Behind Materials Preparation, Polishing, 2007, 8 pages.
Teutenberg, et al. High Temperature Liquid Chromatography—A Brief Review About an Emerging Technique. Chromatography Today. 2010, 4 pages.
McNeff, et al. Practice and theory of high temperature liquid chromatography. J. Sep. Scie. 2007, 30, pp. 1672-1985.
Teutenberg, et al. Potential of high temperature liquid chromatography for the improvement of separation efficienty—A review. Analytica Chimica Acta 643, 2009, pp. 1-12.
Giegold et al. Determination of sulfonamides and trimethoprim using high temperature HPLC with simultaneous temperature and solvent gradient. J. Sep. Sci. 2008, 31, pp. 3497-3502.
Li, et al. Effect of Temperature on the Thermodynamic Properties, Kinetic Performance, and Stability of Polybutadiene-Coated Zirconia. Anal. Chem. 1997, 69, pp. 837-843.
Xiang, et al. Elevated-Temperature Ultrahigh-Pressure Liquid Chromatography Using Very Small Polybutadiene-Coated Nonporous Zirconia Particles. J. Chromatography, 983, 2003, pp. 83-89.
Greibrokk, et al. Temperature programming in liquid chromatography. J. Sep. Sci. 2001, 24, pp. 899-909.
Dolan et al. Reversed-phase liquid chromatographic separation of complex samples by optimizing temperature and gradient time III. Improving the accuracy of computer simulation. Journal of Chromathography, 857, 1999, pp. 41-68.
Guillarme et al. Effect of temperature in reversed phase liquid chromatography. J. of Chromatography, 1052, 2004, pp. 39-51.
Molander et al. Determination of retinoids by packed-capillary liquid chromatography with large-volume on-column focusing and temperature optimization. J. of Chromatography, 847, 1999, pp. 59-68.
Gagliardi et al. Modeling Retention and Selectivity as a Function of pH and Column Temperature in Liquid Chromatography. Anal. Chem. 2006, 78, 5858-5867.
Teutenberg et al. High-temperature liquid chromatography. Part III: Determination of the static permittivities of pure solvents and binary solvent mixtures-Implications for liquid chromatographic separations. J. of Chromatography, 1216, 2009, pp. 8480-8487.
Godin et al. Temperature-Programmed High-Performance Liquid Chromatography Coupled to Isotope Ratio Mass Spectrometry. Anal. Chem, 2008, 7144-7152.
Boer et al. High-Temperature Liquid Chromatography Coupled On-Line to a Continuous-Flow Biochemical Screening Assay with Electrospray Ionization Mass Spectrometric Detection. Anal. Chem. 2005, 77, pp. 7894-7900.
Louden et al. High temperature reversed-phase HPLC using deuterium oxide as a mobile phase for the separation of model pharmaceuticals with multiple on-line spectroscopic analysis. Analyst, 2001, pp. 1625-1629.
Yang et al. HPLC Separations with Micro-Bore Columns Using High-Temperature Water and Flame Ionization Detection. Journal of Chromatographic Science, vol. 43, 2005, 4 pages.
Vervoort et al. Characterisation of reversed-phase stationary phases for the liquid chromatographic analysis of basic pharmaceuticals by thermodynamic data. J. Chromatography, 964, 2002, pp. 67-76.
Gritti et al. Adsorption Mechanisms and Effect of Temperature in Reversed-Phase Liquid Chromatography. Meaning of the Classical Van't Hoff Plot in Chromatography. Anal. Chem. 2006, pp. 4642-4653.
Liu et al. Evaluation of a C18 hybrid stationary phase using high-temperature chromatography. Analytica Chimica, 2005, pp. 144-151.
McCalley et al. The challenges of the analysis of basic compounds by high performance liquid chromatography: Some possible approaches for improved separations. Journal of Chromatography A, 1217 (2010) 858-880.
Neue et al. Dependence of reversed-phase retention of ionizalbe analytes on pH, concentration of organic solvent and silanol activity. J. of Chromatography, 925, 2001, pp. 49-67.
McCalley et al. Comparative evaluation of bonded-silica reversed-phase columns for high-performance liquid chromatography using strongly basic compounds and alternative organic modifiers buffered at acid pH. J. of Chromatography, 769, 1997, pp. 169-178.
McCalley et al. Comparison of the performance of conventional C18 phases with others of alternative functionality for the analysis of basic compounds by reversed-phase high-performance liquid chromatography. J. of Chromatography, 844, 1999, pp. 23-38.
McCalley et al. Effect of temperature and flow-rate on analysis of basic compounds in high-performance liquid chromatography using a reversed-phase column. Journal of Chromatography, 902, 2000, pp. 311-321.
Saini et al. Core—Shell Diamond as a Support for Solid-Phase Extraction and High-Performance Liquid Chromatography. Anal. Chem. 2010, 82, pp. 4448-4456.
Saini et al. C18, C8, and perfluoro reversed phases on diamond for solid-phase extraction. Jounal of Chromatography, 1216, 2009, pp. 3587-3593.
Saini et al. Amino-Modified Diamond as a Durable Stationary Phase for Solid-Phase Extraction. Anal. Chem. 2008, 80, pp. 6253-6259.
Saini et al. Directing polyallylammine adsorption on microlens array patterned silicon for microarray fabrication. Lab Chip, 2009, 9, pp. 1789-1796.
Chester et al. Effect of phase ratio on van't Hoff analysis in reversed-phase liquid chromatography, and phase-ratio-independent estimation of transfer enthalpy. Journal of Chromatography, 1003, 2003, pp. 101-111.
Antia et al. High-Performance Liquid Chromatography at Elevated Temperatures: Examination of Conditions for the Rapid Separation of Large Molecules. Elsevier Science Publishers. 1987, 15 pages.
U.S. Appl. No. 12/463,899, May 16, 2011, Restriction Requirement.
U.S. Appl. No. 12/463,899, Jul. 15, 2011, Office Action.
U.S. Appl. No. 12/463,899, Oct. 19, 2011, Office Action.
U.S. Appl. No. 12/039,382, Dec. 31, 2008, Restriction Requirement.
U.S. Appl. No. 12/039,382, Feb. 27, 2009, Office Action.
U.S. Appl. No. 12/039,382, Sep. 30, 2009, Office Action.
U.S. Appl. No. 12/039,382, Mar. 17, 2010, Office Action.
U.S. Appl. No. 12/039,382, Jul. 21, 2011, Office Action.
U.S. Appl. No. 12/039,382, Jan. 20, 2012, Office Action.
U.S. Appl. No. 12/040,638, Feb. 9, 2009, Office Action.
U.S. Appl. No. 12/040,638, Aug. 4, 2009, Office Action.
U.S. Appl. No. 12/040,638, Jan. 26, 2010, Office Action.
U.S. Appl. No. 12/040,638, Aug. 6, 2010, Office Action.
U.S. Appl. No. 13/035,597, Jan. 24, 2013, Office Action.
U.S. Appl. No. 61/458,068, filed Nov. 17, 2010, Linford et al.
Wiest, Landon A., et al.; "Pellicular Particles with Spherical Carbon Cores and Porous Nanodiamond/Polymer Shells for Reversed-Phase HPCL"; Anal. Chem. 2011, 83, 5488-5501.
U.S. Appl. No. 61/192,841, filed Sep. 22, 2008, Linford et al.
U.S. Appl. No. 12/563,646, filed Sep. 21, 2009, Linford et al.
U.S. Appl. No. 61/339,091, filed Feb. 26, 2010, Linford et al.
U.S. Appl. No. 13/035,597, filed Feb. 25, 2011, Linford et al.
U.S. Appl. No. 13/408,059, filed Feb. 29, 2012, Linford et al.
U.S. Appl. No. 61/464,403, filed Mar. 3, 2011, Linford et al.
Tsubota, Toshiki et al, Chemical Modification of Diamond Surface with Long Alkyl Chain Containing Carboxylic Acid in Benzoyl Peroxide containing Organic Solution, Journal of the Surface Finishing Society of Japan, vol. 54, No. 11, pp. 758-763 (6 pages), (2003).

(56) References Cited

OTHER PUBLICATIONS

Chen et al., Rapid Separation of Proteins by Reversed Phase HPLC at Elevated Temperatures, Anal. Methods Instrum. 1 (1993) pp. 213-222.
Andersen, et al. Retention and Thermodynamics of Homologous Series in Reversed-Phase Liquid Chomatography, pp. 52-61 (1990).
McCalley, D.V. Advances in Chromatography, vol. 46, CRC Press, Boca Raton, 2008, pp. 305-350.
Grushka et al. Advances in Chromatography, CRC press, Boca Raton, vol. 44, 2005, pp. 45-77.
Scheuermann et al., Abstract of: Palladium Nanoparticles on Graphite Oxide and Its Functionalized Graphene Derivatives as Highly Active Catalysts for the Suzuki-Miyaura Coupling Reaction, 2009 American Chemistry Society (1 page), available as of Jul. 30, 2009.
Knox et al, Surface Modification of Porous Graphite for Ion Exchange ChromatographyDepartment of Chemistry, University of Edinburgh, Chromatographia vol. 42, No. 1/2, Jan. 1996—(6 pages).
McAllister et al., Abstract of: Single Sheet Functionalized Graphene by Oxidation and Thermal Expansion of Graphite, Publication Date (Web): May 25, 2007 (1 page).
DERWENT_Packing for gas chromatography column—consists of granulated fluorinated graphite, Aug. 30, 1981.
Technical Guide—Fluophase and Fluofix Columns, TG 01-08 (6 pages), available as of Sep. 21, 2009.
Worsley et al., "Soluble graphene derived from graphite fluoride" Chemical Physics Letters, vol. 445, No. 1-3, Aug. 23, 2007, pp. 51-56.
Zhou et al., Evaluation of Expanded Graphite a On-line Solid-phase Extraction Sorbent for High Performance Liquid Chromatographic determination of Trace Levels of DDTs in Water Samples, 2006, vol. 69, No. 4, pp. 9710-975, Talanta, Elsevier, Amsterdam, NL.
International Search Report and Written Opinion from International Application No. PCT/US2009/057662 dated Dec. 23, 2009.
International Search Report and Written Opinion from International Application No. PCT/US2011/026300 dated Jun. 29, 2011.
U.S. Appl. No. 12/774,777, Jul. 24, 2012, Office Action.
U.S. Appl. No. 12/774,777, Sep. 10, 2012, Office Action.
U.S. Appl. No. 12/563,646, Jan. 24, 2012, Office Action.
U.S. Appl. No. 12/563,646, Apr. 6, 2012, Office Action.
U.S. Appl. No. 12/563,646, Jul. 25, 2012, Office Action.
U.S. Appl. No. 13/035,597, Apr. 15, 2013, Office Action.
Kudryavtsev, On the Kinetics of Polyacrylamide Alkaline Hydrolysis, Macromolecules, vol. 31, Mar. 3, 1998, 4642-4644 (3pp.).
Rabieee et al., Synthesis of High Molecular Weight Partially Hydrolyzed Polyacrylamide and Investigation on its Properties, Iranian Polymer Journal, vol. 14, No. 7, 2005 (6 pp.).
Zeynali et al., Alkaline Hydrolysis of Polyacrylamide and Study on Poly(acrylamide-co-sodium acrylate) Properties, Iranian Polymer Journal, vol. 11, No. 4, 2002 (7 pp.).
U.S. Appl. No. 12/039,382, Jul. 15, 2013, Office Action.
U.S. Appl. No. 12/040,638, Feb. 28, 2013, Office Action.
U.S. Appl. No. 12/040,638, Aug. 29, 2013, Office Action.
International Search Report and Written Opinion from International Application No. PCT/US2011/060834 dated Mar. 29, 2012.
U.S. Appl. No. 13/035,597, Sep. 29, 2013, Office Action.

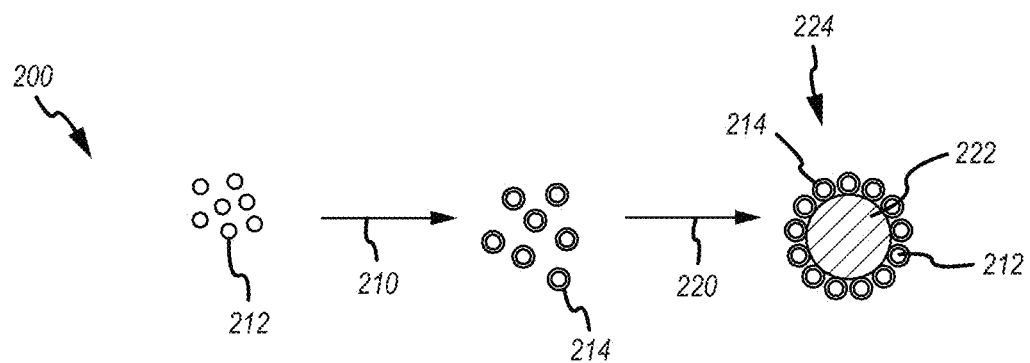
*Fig. 2*
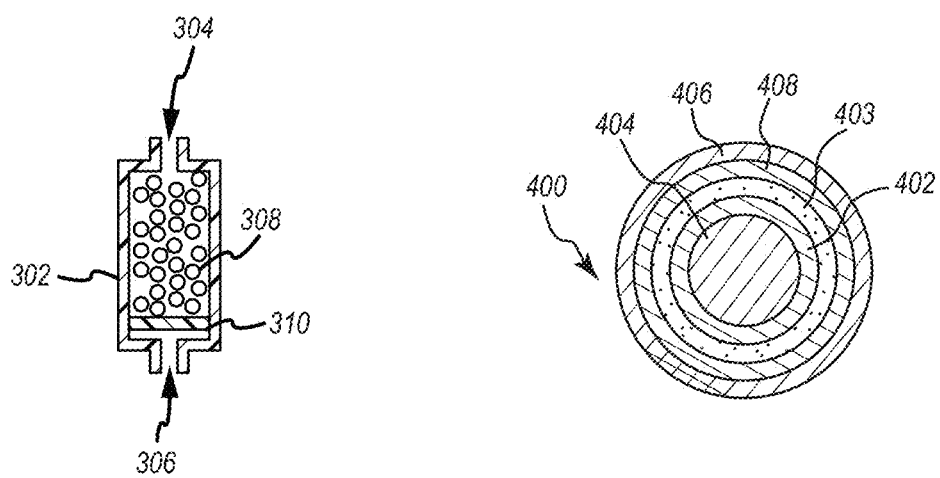
*Fig. 3*                *Fig. 4*

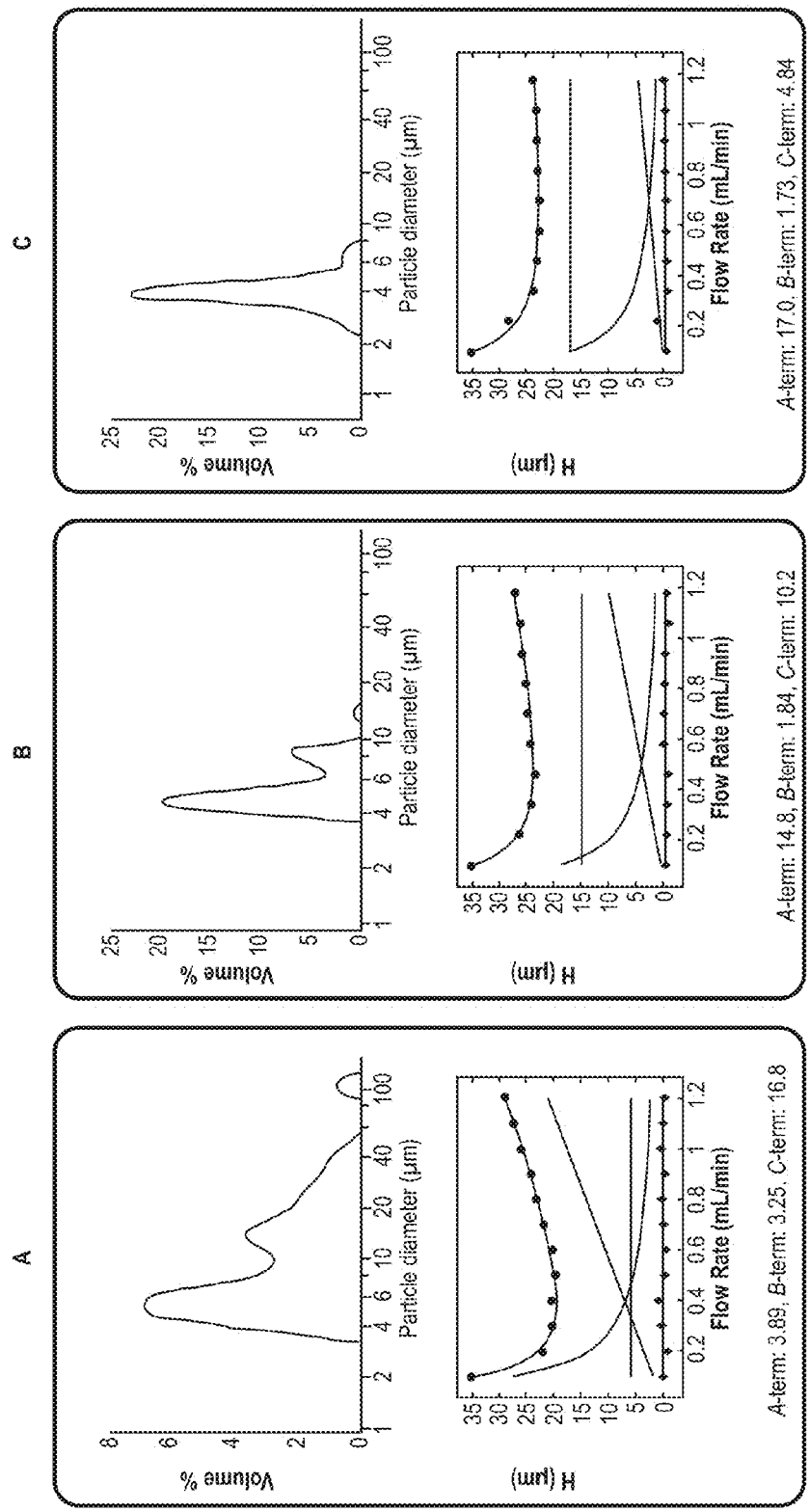
*Fig. 18A*  *Fig. 18B*  *Fig. 18C*

SONICATION FOR IMPROVED PARTICLE SIZE DISTRIBUTION OF CORE-SHELL PARTICLES

CROSS-REFERENCE TO RELATED APPLICATIONS

This application claims the benefit of U.S. Provisional Application No. 61/458,068 filed on Nov. 17, 2010, entitled "SONICATION FOR DISTRIBUTION OF DIAMOND-BASED PARTICLES," which is incorporated herein, in its entirety, by this reference.

BACKGROUND

Chromatography and solid-phase extraction ("SPE") are commonly-used separation techniques employed in a variety of analytical chemistry and biochemistry environments. Chromatography and SPE are often used for separation, extraction, and analysis of various constituents, or fractions, of a sample of interest. Chromatography and SPE may also be used for the preparation, purification, concentration, and clean-up of samples.

Chromatography and SPE relate to any of a variety of techniques used to separate complex mixtures based on differential affinities of components of a sample carried by a mobile phase with which the sample flows, and a stationary phase through which the sample passes. Typically, chromatography and SPE involve the use of a stationary phase that includes an adsorbent packed into a cartridge or column. A commonly-used stationary phase includes a silica-gel-based sorbent material. Reverse phase chromatography is a type of chromatography in which the stationary phase is substantially non-polar (e.g., hydrophobic), while the mobile phase is typically moderately polar (e.g., an aqueous moderately polar phase).

Mobile phases are often solvent-based liquids, although gas chromatography typically employs a gaseous mobile phases. Liquid mobile phases may vary significantly in their compositions depending on various characteristics of the sample being analyzed and on the various components sought to be extracted and/or analyzed in the sample. For example, liquid mobile phases may vary significantly in pH and solvent properties. Additionally, liquid mobile phases may vary in their compositions depending on the characteristics of the stationary phase that is being employed. Often, several different mobile phases are employed during a given chromatography or SPE procedure. Stationary phase materials may also exhibit poor stability characteristics in the presence of various mobile phase compositions and/or complex mixtures for which separation is desired. The poor stability characteristics of stationary phase materials in some mobile phases and complex mixtures, in some cases, may even preclude the possibility of using chromatography or SPE to perform the desired separation.

SUMMARY

Embodiments disclosed herein are directed to methods of manufacturing porous composite particulate materials for use in separation technologies, including, but not limited to, chromatography (e.g., high performance liquid chromatography ("HPLC"), including reverse-phase HPLC) and SPE. In an embodiment, a porous composite particulate material includes a plurality of composite particles. Each composite particle includes an acid-base-resistant core particle at least partially surrounded by one or more layers of acid-base-resistant shell particles. The shell particles may be bonded to the generally spherical core particles by a polymeric layer of one or more polymers, which is acid-base resistant. Sonic energy is applied during and/or after the shell particles, polymers, or both are applied. In an embodiment, sonic energy is applied with each bilayer deposition step.

In an embodiment, a method for manufacturing a porous composite particulate material includes providing a plurality of acid-base-resistant core particles and a plurality of acid-base-resistant shell particles. At least a portion of the core particles, at least a portion of the shell particles, or both may be coated with polymeric material. A portion of the shell particles are adhered to each core particle to form a plurality of composite particles. For example, each core particle may have a plurality of shell particles bonded thereto by the polymer material. Sonic energy is applied during and/or after the shell particles, polymers, or both are applied to the core particles. In an embodiment, sonic energy is applied after each bilayer deposition step (e.g., application of shell particles, polymer, followed by sonication). Application of sonic energy increases the uniformity of particle size distribution of the composite material.

In an embodiment the polymeric layer may be highly cross-linked to provide mechanical stability, while still providing sufficient chemical stability. The shell particles and/or core particles may also be made from a material that is stable in harsh chemical conditions. For example, the shell particles and/or core particles may be made from diamond, graphitic carbon, glassy carbon, silicon carbide, boron nitride, tungsten carbide, niobium carbide, combinations thereof, or other suitable acid-base-resistant material that is chemically stable in acids and bases over a wide pH range. Examples of other acid-base-resistant materials from which the shell particles and/or core particles may be made include zirconia, noble metals, acid-base stable highly cross-linked polymers, acid-base stable at least partially cross-linked polymers, titania, alumina, thoria or combinations of the foregoing. In an embodiment, the shell particles comprise diamond, a diamond-like material, a graphitic material, glassy carbon, or combinations of the foregoing. In a more specific embodiment, the spherical core particles comprise glassy carbon while the shell particles comprise nano-diamond.

The one or more polymers used to adhere the shell particles to the core particles and/or to each other may also be selected to be stable in harsh chemical conditions. For example, in one embodiment, the one or more adhering polymers may be an amine polymer. The one or more adhering polymers may also be cross-linked (e.g., using epoxide moieties) to add mechanical strength to polymeric binding matrix and/or include functionalizing moieties (e.g., anionic moieties) to give the composite particulate material desired properties for separating components of a mobile phase. In another embodiment, the adhering polymers may also be substantially neutral polymers (i.e., non-ionic). Substantially neutral polymers may have a few ionic or polar groups so long as the molecule is large enough that the molecule behaves similar to typical non-ionic polymers (e.g., a PAAm molecule having a few amines). An example of a substantially neutral polymer is poly(allylamine) because the neutral amines on poly(allylamine) remain largely unprotonated in an aqueous solution.

The shell particles may be bonded to the outside of the core particle to achieve a composite particle with a desired size and/or surface area. Moreover, the relative size of the core particles and shell particles and the number of layers of shell particles may be selected to provide composite particles with a surface area and porosity suitable for chromatography and/or solid phase extraction. The use of core particles bonded to shell particles provides combinations of particle sizes and surface areas that may not be possible with simple mixtures of un-bonded particles of the same material.

In another embodiment, a separation apparatus for performing chromatography or solid phase separation is described. The separation apparatus includes a vessel having an inlet and an outlet. Any of the porous composite particulate materials disclosed herein may be disposed within the vessel. The vessel may be a column or a cassette suitable for use in the fields of chromatography and/or solid phase separation (e.g., HPLC and ultra performance liquid chromatography ("HPLC")). For example, in an embodiment, the composite material may exhibit a particle size distribution that is tightly grouped around a desired average particle diameter (e.g., about 4 μm).

The separation apparatus may be used to physically separate different components from one another. In an embodiment, a mobile phase including at least two different components to be separated is caused to flow through the composite particulate material to physically separate the at least two different components. At least one of the two different components is recovered.

In an embodiment, the composite particles are made from diamond, graphitic carbon, glassy carbon, silicon carbide, boron nitride, tungsten carbide, niobium carbide, combinations thereof, or other suitable acid-base-resistant material that is stable in chemically harsh conditions. Examples of other acid-base-resistant materials include zirconia, noble metals, acid-base stable highly cross-linked polymers, acid-base stable at least partially cross-linked polymers, titania, alumina, thoria, or combinations of the foregoing. The composite particles in some cases may be used with a mobile phase that would typically degrade commonly used stationary phase materials, such as a silica gel.

Features from any of the disclosed embodiments may be used in combination with one another, without limitation. In addition, other features and advantages of the present disclosure will become apparent to those of ordinary skill in the art through consideration of the following detailed description and the accompanying drawings.

BRIEF DESCRIPTION OF THE DRAWINGS

The drawings illustrate several embodiments of the invention, wherein identical reference numerals refer to identical elements or features in different views or embodiments shown in the drawings.

FIG. 2 is a schematic diagram illustrating another method for making a composite particulate material according to an embodiment;

FIG. 3 is a cross-sectional view of a vessel used for forming a body of bonded composite particles according to an embodiment;

FIG. 4 is a cross-sectional view of a composite particle according to an embodiment;

FIGS. 18A-18C show particle size distributions of core-shell particles synthesized in three different ways (particles that were not sonicated, particles that were sonicated prior to the first nano-diamond deposition, and particles that were sonicated prior to every nano-diamond deposition), and corresponding Van Deemter curves for columns packed with these particles, with n-butylbenzene as analyte;

DETAILED DESCRIPTION

Figure 1:
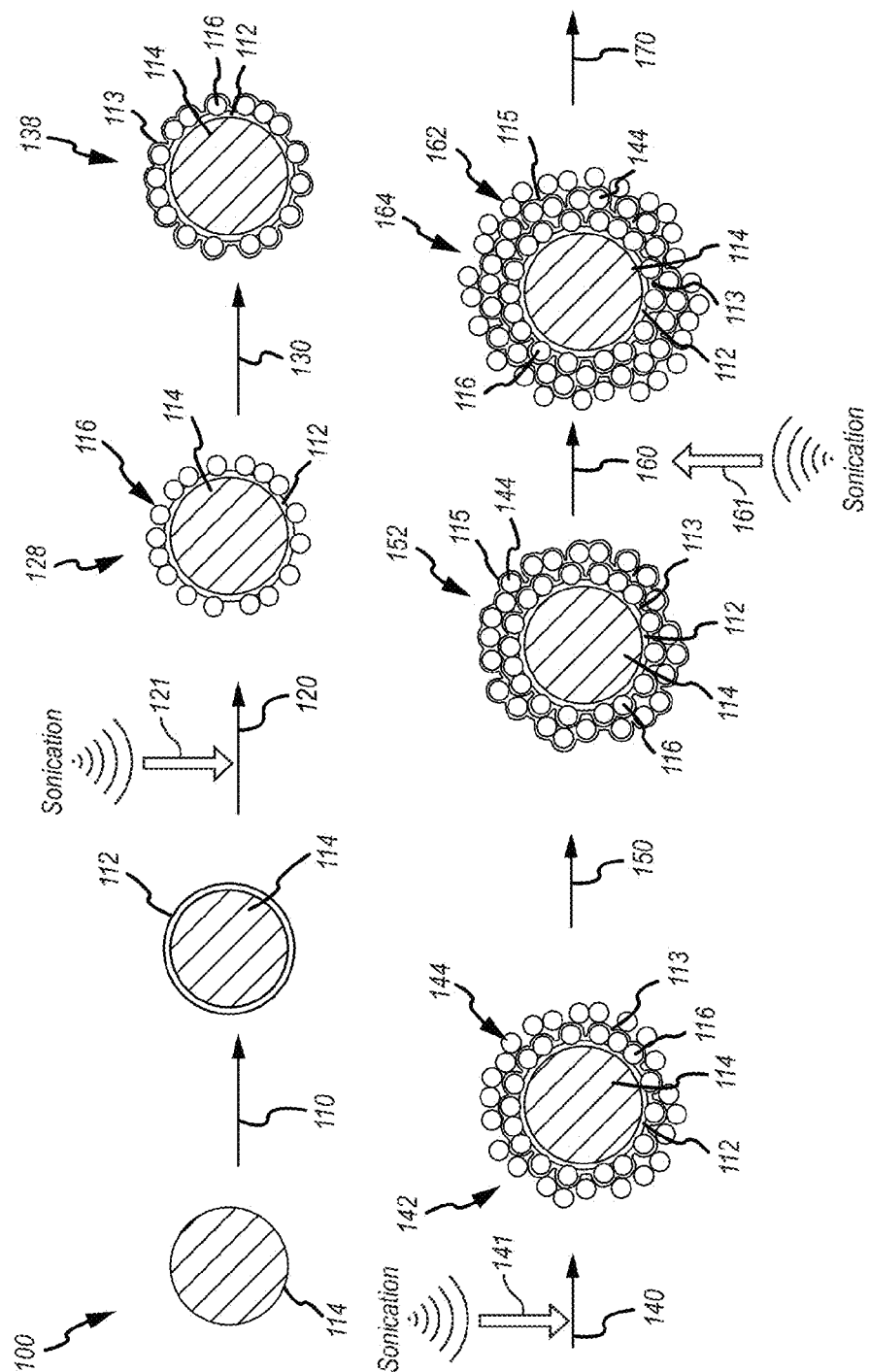
FIG. 1 is a schematic flow diagram illustrating a method for making a composite particulate material according to an embodiment.

I. Components Used to Make Porous Composite Particulate Materials

A. Acid-Base-Resistant Particles

The porous composite particulate materials disclosed herein include a plurality of composite particles. Each composite particle includes an acid-base-resistant generally spherical core particle, and a plurality of acid-base-resistant shell particles that at least partially surround and are bonded to the core particle by a layer of polymer material to impart a desired size and surface area. The core particles and shell particles may be made from the same material or different materials.

The core particles and/or shell particles may be of a solid, porous, composite, synthetic, and/or natural occurring material. For example, the shell particles and/or core particles may be made from diamond, graphitic carbon, glassy carbon, silicon carbide, boron nitride, tungsten carbide, niobium carbide, combinations thereof, or other suitable acid-base-resistant material that is chemically stable in acids and bases over a wide pH range. For example, as an alternative to the aforementioned acid-base-resistant materials, at least a portion of the shell particles may be made from nano-graphite having a particle size of about 1 μm or less. Examples of other acid-base resistant materials include zirconia, noble metals, acid-base-stable highly cross-linked polymers, titania, alumina, or combinations of the foregoing. In a specific embodiment, the spherical core particle comprises glassy carbon, while the shell particles comprise nano-diamond particles.

As used herein, the term "highly cross-linked polymers" refers to polymers with sufficient cross-linking that prevent swelling of the polymer in the presence of an organic solvent (e.g., prevent greater than 1% swelling or greater than 5% swelling). In one or more embodiments, the cross-linking may be about 1% to about 99%, at least about 70%, about 55% to about 75%, about 75% to about 95%, at least about 85%, at least about 95%, or even at least about 99%. However, in some embodiments using percentages less than about 99%, less than about 95%, or less than 85% may be useful so that the polymer exhibits a sufficient toughness to avoid cracking and/or swelling during use.

The core particles and the shell particles may have the same or different particle sizes. As used herein, the phrase "particle size" means the approximate average particle size, such as average diameter or other average cross-sectional dimension of a plurality of particles, unless otherwise specified. In an embodiment, the shell particles are much smaller than the core particles to achieve a desired composite-particle surface area. In an embodiment, the shell particles have a particle size that is in a range from about 1 nm to 1000 nm, more specifically in a range from about 2 nm to about 500 nm, even more specifically in a range from about 5 nm to about 200 nm, and yet even more specifically in a range from about 10 nm to about 100 nm (e.g., about 10 nm to about 20 nm). The core particles may have a particle size in a range from about 0.5 μm to about 500 μm, more specifically about 1 μm to about 200 μm, or even more specifically in a range from about 1 μm to about 100 μm. The desired particle size of the core particles may depend on the application in which the composite particle is to be used. In one embodiment, the core particles have a particle size in a range from about 0.5 μm to 10 μm, more specifically about 1.5 μm to about 7 μm. This range may be suitable for HPLC applications and the like. In another embodiment, the particle size of the core particles may be in a range from about 5 μm to about 500 μm, or more specifically in a range from about 10 μm to about 150 μm. This larger range may be suitable for solid phase extraction applications and the like.

The acid-base-resistant shell and core particles may have a composition that is selected to be stable in sundry mobile phases, including organic solvents, and chemically harsh acids and bases. Examples of acid-base-resistant materials from which the shell particles and the core particles may be made include, but are not limited to, diamond, graphitic carbon (e.g., graphite), glassy carbon, silicon carbide, or another suitable material that is chemically stable in acids and bases over a pH range of at least 3 to 12. For example, diamond, graphite, and silicon carbide are chemically stable in acids and bases over a pH range of about 0 to about 14. Silica and alumina are examples of materials that are not acid-base-resistant materials, because they may significantly degrade in bases with a pH greater than 12. Other relatively acid-base-resistant materials include, but are not limited to, boron nitride and tungsten carbide. Yet other examples of other acid-base-resistant materials include zirconia, noble metals, titania, thoria, or combinations of the foregoing. Further embodiments of an acid-base-resistant material may be a polymer that is at least partially cross-linked.

Diamond possesses remarkable chemical inertness, hardness, low compressibility, optical transparency, and high thermal conductivity that may help eliminate thermal gradients in ultra performance liquid chromatography. Unlike silica, diamond does not easily dissolve in aqueous alkaline or acidic media, and it may be used in extremely harsh chemical environments. These properties of diamond may be achieved with naturally occurring diamond and/or synthetic diamond. Diamond material may also include other inorganic carbon materials, such as graphitic carbon, glassy carbon, fullerenes, other non-diamond carbon, or combinations thereof.

The acid-base-resistant shell and core particles may be produced through any suitable method, including, for example, by forming carbonaceous material into diamond material under ultra-high pressure and high-temperature conditions or other synthetic diamond processes. Additionally, the acid-base-resistant shell and core particles may be the product of natural processes or chemical vapor deposition processes. Acid-base-resistant shell and core particles may be produced by crushing and/or grinding a mineral starting material to obtain a desired sized particle. In an embodiment, the acid-base-resistant core particles may comprise micron-sized diamond particles with, for example, a particle size of about 1 μm to about 500 μm (e.g., about 1 μm to about 100 μm) and the acid-base-resistant shell particles may comprise diamond particles, with for example, a particle size of about 1 nm to 1000 nm (e.g., about 2 nm to about 200 nm). The acid-base-resistant shell and core particles may have a spherical shape, a faceted shape, an irregular shape, or other suitable geometry.

In some embodiments, the acid-base-resistant core particles may be substantially non-porous. However, in other embodiments, the acid-base-resistant core particles may be porous.

In one embodiment, the acid-base-resistant shell and/or core particles are selected to be generally spherical. While most, if not all, the particle materials disclosed herein may be made into generally spherical particles, certain materials are more easily produced as generally spherical particles. For example, in one embodiment the acid-base-resistant shell and core particles may be generally spherical, and may comprise graphite, zirconia, titania, noble metals, acid-base-resistant highly cross-linked polymers, acid-base-resistant at least partially cross-linked polymers, alumina, thoria, or combinations of these.

While generally spherical particles may be used as shell particles, generally spherical particles may be more advantageously used as core particles. The use of non-spherical core particles typically has a greater impact on the back pressure and mobile phase flow profile created by the composite particles compared to non-spherical shell particles and the reproducibility of the porous composite particulate materials. Moreover, since the core particles may be substantially isolated from the mobile phase by the shell particles and polymeric materials, the materials used to make the core particles may be less compatible with the constituents of the mobile phase as compared to the shell particles (e.g., the use of alumina as a core particle). Thus, the core particles may more readily be configured to have a generally spherical geometry.

In one embodiment, the core particle may be a composite particle of an inner region and a cladding layer surrounding and/or partially or completely encapsulating the inner region. The inner region may include materials that are acid-base unstable and/or incompatible with constituents of a mobile phase. The inner region of the core particle may include a ceramic, polymeric, or metallic material that may be unstable in acids and bases (e.g. silica gel) and/or non-compatible with certain constituents of chromatography mobile phases. In this embodiment, the cladding layer may be made from an acid-base resistant material that gives the core particles acid-base resistant properties and/or compatibility. In one embodiment, the cladding material may be made from any of the acid-base resistant materials disclosed herein, including, but not limited to, diamond, graphitic carbon, glassy carbon, tungsten carbide, niobium carbide, boron nitride, zirconia, noble metals, acid-base-stable highly cross-linked polymers, titania, alumina, thoria, and any combinations thereof. In contrast, the materials used in the inner region may be made from any material upon which the cladding layer may be deposited. While not required, the materials used in the inner region may even be acid-base unstable so long as the cladding layer substantially encapsulates the acid-base unstable material.

Core particles including an inner region and a cladding layer may be manufactured by starting with an inner particle made from ceramic, polymeric, or metal upon which the cladding layer is deposited. The inner particle may have an average diameter ranging from about 0.5 μm to about 50 μm, more specifically about 0.75 μm to about 10 μm, or even more specifically about 1 μm to about 5 μm. The cladding layer may be applied as a thin coating. In one embodiment, the cladding layer has a thickness less than 5 μm, more specifically less than 1 μm, even more specifically less than 0.5 μm. The cladding layer may be applied to the inner particle using any technique known in the art, including but not limited to chemical vapor deposition, physical vapor deposition, atomic layer deposition, or another suitable deposition technique.

In another embodiment, the cladding layer may be formed on the inner particle by dipping the inner particles in a carbonizable polymer and then heating the material to form graphitic carbon. Those skilled in the art are familiar with reagents (e.g., resins, polymers, and catalysts) used to make graphitic carbon through pyrolysis and similar methods. To illustrate one example formula, a core particle including the cladding may be made by (i) providing a generally spherical inner particle made from a ceramic, polymer, or metal, (ii) dipping the inner particle in a melt of polymerizable resin such phenol and hexamine (6:1 w/w); (iii) remove excess melt, (iv) heating the coated particles gradually (e.g., to 150° C.) to form a phenol formaldehyde resin around the particles; and (v) carbonizing the resin around the particles by slow heating (e,g, less than 5° C./min) in an oxygen free oven to form a substantially impervious carbonaceous/glassy carbon shell. For example, the resin may be carbonized by heating, such as heating to about 900° C.

In yet another embodiment, the particles may be coated with the polymer by applying a polymeric material while forcing air or other gas up through the particles to suspend the particles. Producing a core particle using an inner particle and a cladding layer is useful for forming generally spherical particles. In one embodiment, the inner region may be manufactured to be spherical and the cladding layer may be applied to the generally spherical inner region to yield a generally spherical core particle.

B. Polymeric Materials

The coating or binding polymer used to bond the shell particles to the core particle and/or other shell particles may be any polymeric material that may be applied in a coating to adhere the acid-base-resistant particles to one another. For example, the polymer coating may include a polymeric material comprising one or more polymers that provide the porous composite particulate material with desired properties for separating components of a mobile phase. The polymer coating may also be stable over the same pH ranges as the acid-base-resistant core and shell particles to provide a chemically resistant polymer coating. The polymer coating may include macromonomers, oligomers, and/or various polymers, without limitation. The polymer coating may include combinations and/or mixtures of different polymeric materials and/or be used to form different layers of polymers as described more fully below.

In one embodiment, the polymer coating or binding polymer may include at least one amine group. The amine polymer may be selected to be chemically stable in many of the same mobile phases that diamond particles or other acid-base-resistant materials disclosed herein are stable. In an embodiment, the amine polymer includes at least one pendant amine group and/or at least one primary, secondary, tertiary, and/or quaternary amine group. In various embodiments, the polymer coating may include for example, polyallylamine, polyethylenimine, polylysine, polyvinylamine, chitosan, trimethylchitosan (i.e., quaternized chitosan), polydiallydimethyl ammonium chloride ("PDADMAC"), poly(N,N'-dimethylaminoethylmethacrylate), poly(2-vinylpyridine), poly(4-vinylpyridine), polyvinylimidazole, poly(2-(dimethylamino)ethyl acrylate), and/or poly(2-aminoethyl methacrylate) hydrochloride, combinations of the foregoing, and/or derivatives of the foregoing.

Polyethylenimine and/or polyallylamine may be present in the polymer coating in a wide range of molecular weights and degrees of branching. Chitosan may be produced by the deacetylation of chitin, and chitin may be deacetylated to various degrees. Polymers in the coating may be substantially linear or at least partially branched. Polymers including amines therein may be protonated, deprotonated, or partially protonated prior to, during, and/or following deposition on a surface. Additionally, the polymer coating may comprise any suitable naturally occurring proteins and/or peptides.

In additional embodiments, the polymer coating may include a homopolymer and/or a copolymer compound formed from monomer subunits including, for example, allylamine, vinylamine, ethylenimine, vinyl amine, lysine, arginine, histidine, 2-isocyanatoethyl methacrylate, aziridine, 1-vinylimidazole, 1-vinyl-2-pyrrolidone, 2-vinylpyridine, 4-vinylpyridine, 2-(dimethylamino)ethyl acrylate, 2-aminoethyl methacrylate hydrochloride, and/or 2-(tert-butylamino) ethyl methacrylate.

Additionally, the polymer coating may include any suitable monomers that may be converted into amines after polymerization by deprotection, hydrolysis, and/or by simple chemical transformation. In various embodiments, the polymer coating may include monomers based on oxazoline, which may be polymerized to form polyoxazolines and/or which may then be hydrolyzed. Amine-comprising monomers forming a polymeric compound in coating may be protonated, deprotonated, or partially protonated prior to, during, and/or following polymerization. The amine polymers may also be substantially neutral polymers.

In at least one embodiment, monomers forming a polymer in the polymer coating may be interspersed with other monomer units such as 2-hydroxyethylacrylate, styrene, 1,3-butadiene, methyl methacrylate, methyl acrylate, butyl acrylate, dodecyl methacrylate, acrylonitrile, acrylic acid, methacrylic acid, 4-vinylbenzyl chloride, 4-(trifluoromethyl)styrene, 3-nitrostyrene, vinyl ether, or vinyl acetate.

The polymer coating may include a polymeric compound having various chain lengths and various degrees of branching. For example, the polymeric coating may include a polymeric compound having a weight-average molecular weight or number-average molecular weight ranging from about 1,000 to about 2,500,000. In certain embodiments, the polymer coating may include a polymeric compound having a weight-average molecular weight or number-average molecular weight ranging from about 5,000 to about 100,000. Additionally, the polymer coating may include a polymeric compound having a weight-average molecular weight or number-average molecular weight ranging from about 30,000 to about 60,000 monomer units. In additional embodiments, the polymer coating may include polymeric compounds having a weight-average molecular weight or number-average molecular weight of less than about 1,000. The polymer coating may optionally include oligomers having a chain length of from 2 to 100 monomer units in length. As used herein, the term "polymeric compound" includes oligomers as well as polymers of varying chain lengths and molecular weights, unless otherwise specified.

Additional information about suitable polymers for use in the porous composite particulate materials disclosed herein may also be found in U.S. patent application Ser. No. 12/039, 382 filed on 28 Feb. 2008, entitled "Methods For Direct Attachment Of Polymers To Diamond Surfaces And Articles Formed Thereby," naming Matthew R. Linford and Li Yang as inventors, which is hereby incorporated herein, in its entirety, by reference.

In some embodiments, the polymer coating includes one or more anionic polymers. Anionic polymers may be useful for ion exchange chromatography. Examples of suitable anionic polymers include, but are not limited to poly(styrenesulfonic acid, sodium salt), poly(acrylic acid), poly(methacrylic acid), derivatives of these, and/or combinations of these. While the polymer coating may be suitable for separating components of a mobile phase, uncoated, exposed surfaces of the core particles and/or shell particles (e.g., diamond core and shell particles) may be functionalized for separating components of an analyte mixture as an alternative to or in addition to using the polymer coating.

II. Methods for Making Porous Composite Particulate Materials

Reference is now made to FIG. 1 which illustrates a schematic flow diagram 100 of an embodiment of a method for making a porous composite particulate material from core particles, shell particles, and polymer material. FIG. 1 is a schematic illustration and does not necessarily represent the actual shape or sizes of the acid-base-resistant core particles and/or acid-base-resistant shell particles. Moreover, FIG. 1 illustrates a method for forming a single composite particle, and the porous composite particulate materials disclosed herein include a plurality of such composite particles, which may be formed simultaneously.

In step 110, a plurality of acid-base-resistant core particles 114 are immersed in a polymeric material that coats and at least partially surrounds each core particle 114 with a respective polymer coating 112. In step 120, a first portion of acid-base-resistant shell particles are adhered to each core particle 114 to form a first porous shell layer 116 of shell particles. In order to improve particle size distribution, polymer-coated core particles 114 are exposed to sonic energy after the initial polymer deposition, but prior to shell particle deposition, as shown by arrow 121. The shell particles adhere to the core particles 114 via the polymer coating 112. The thickness and composition of polymer coating 112 may be any thickness that is sufficient so that the shell particles adhere to the core particles 114. The thickness of the polymer coating 112 is typically sufficiently sized so that the polymer does not fill all the voids between adjacent shell particles of the first porous shell layer 116. Maintaining a relatively thin coating may help to provide a desired surface area for the composite particles. In one embodiment, the thickness of the polymer coating 112 may be about 0.1 nm to about 1 µm thick, about 1 nm to about 1 µm, or about 5 nm to about 100 nm. In an embodiment, the thickness of the polymer coating is less than the average diameter of the shell particles, more specifically the thickness is less than about half the diameter of the shell particles, and even more specifically less than one-fourth the diameter of the shell particles. The polymer coating 112 may be cured or otherwise chemically modified in step 120 or in subsequent steps, as described more fully below.

In one embodiment, more than one layer of shell particles may be deposited at a time on the core particle. The number of layers typically depends on the size of the particle and the desired thickness of the previous polymer layer.

The portion of shell particles may be applied to each core particle 114 by suspending the shell particles in a solvent and immersing the coated core particles 114 in the suspension of shell particles or, alternatively, the suspension of shell particles may be caused to flow over the core particles 114. Any solvent suitable for suspending the core particles and/or the shell particles may be used. In one embodiment, the core particles and/or the shell particles may be suspended in water. The coating of shell particles on the coated core particles 114 yields intermediate composite particles 128 having rough surfaces. The rough surface includes voids (i.e., recesses in the surface) between the individual shell particles of the first porous shell layer 116.

A plurality of the intermediate composite particles 128 may be used as a final product if desired and/or cross-linked to improve mechanical stability. However, substantially increased surface area may be achieved by repeating steps 110 and 120 to yield intermediate composite particles with increasing numbers of porous shell layers. As shown in step 130, another polymer coating 113 may be applied to the surface of the intermediate composite particle 128 to coat the shell particles of the first porous shell layer 116. The polymer coating 113 may be made from the same or a different polymeric material than the polymeric coating 112 used in step 110.

The thickness of the polymer coating 113 is typically sufficiently sized so that the polymer does not fill all the voids between adjacent shell particles of the first porous shell layer 116. After application of polymer coating 113, and before application of additional layer of shell particles, sonic energy (represented by arrow 141) may again be applied to particle 138. In step 140, a second portion of the shell particles may be applied to intermediate composite particle 138 to yield second intermediate composite particles 142 each having a second porous shell layer 144 of shell particles bonded to the first porous shell layer 116.

In step 150, yet a third polymer coating 115 may be coated on intermediate composite particle 144 to yield intermediate particles 152, with the shell particles of the second porous shell layer 144 being coated. The polymer coating 115 may be made from the same or a different polymeric material than the polymeric coatings 112 or 113 used in steps 110 or 130. The thickness of the polymer coating 115 is typically sufficiently sized so that the polymer does not fill all the voids between adjacent shell particles of the second porous shell layer 144. After application of polymer coating 115 and before application of a third portion of shell particles, sonic energy may again be applied to intermediate particle 152 in order to improve particle size distribution. After sonication, in step 160, a third portion of shell particles may be adhered to the second porous shell layer 144 of intermediate particles 152 to yield intermediate composite particles 164 having a third porous shell layer 162 of shell particles.

The porous shell layers 116, 144, and 162 may have differently or similarly sized shell particles. Also, the shell particles in the different layers may have a different composition and/or be bonded using different compositions of polymer. The different shell particles, core particles, and polymers may be selected from any combination of the components described herein or components known in the art that are similar and/or provide similar function.

The method of adding additional porous shell layers may be continued until a desired number of porous shell layers and/or a desired surface area is achieved for the composite particles. In one embodiment, the method of forming porous shell layers may be repeated at least 5 times, more specifically at least about 10 times, or even more specifically at least 20 times to yield composite particles having 5, 10, 20, or 30 porous shell layers. This method continues until the desired number of porous shell layers is achieved. In one embodiment, the number of porous shell layers is at least about 3, more specifically at least about 5, even more specifically at least about 10, yet even more specifically at least 20. In another embodiment, the number of shell layers is at least 50, about 5 to about 100, or about 10 to about 50.

The shell particles, core particles, and/or composite particles may each be completely or partially coated with the polymer coating. In many cases, the polymer coating is applied using immersion, which tends to apply a relatively even coating around an entire particle. However, in some embodiments, one or more of the acid-base-resistant particles may only be partially coated with a sufficient polymer coating to adhere to other particles. In addition, the application of the shell particles may be asymmetric so as to create asymmetric composite particles.

Application of sonic energy is applied at least once, e.g., after application of one polymer layer and before application of the accompanying shell particles of a polymer/shell particles bilayer. As will be shown hereafter, sonication of the particles during the application of the bilayer improves the particle size distribution by narrowing the distribution of particle sizes present about the average or median particle size, resulting in a more homogenous distribution of particle sizes. In an embodiment, sonication of the particles may be applied more than once. For example, sonication may be applied once for each bilayer application. In another embodiment, sonication may be applied during only a portion of the bilayer applications (e.g., one in two bilayer procedures, or one in three bilayer procedures). The highest degree of homogeneity in particle size distribution occurs where sonication occurs during every bilayer application procedure.

In an embodiment, the particles are sonicated after application of the polymer coating, and before application of the associated shell particles of a particular bilayer application. In another embodiment, the particles may be sonicated only after application of the shell particles of a given bilayer. In another embodiment, the sonic energy may be applied after application of both the polymer coating and the shell particles, or even before application of either component of a given bilayer.

In an embodiment, the particles are sonicated in intervals for a total period of time. For example, total sonication time may be about 1 minute to about 20 minutes, about 2 minutes to about 10 minutes, or about 3 minutes to about 7 minutes (e.g., about 5 minutes). Each interval may be about 5% to about 50% of the total sonication time, about 10% to about 30% of the total sonication time, or about 15% to about 25% (e.g., about 20%) of the total sonication time. By way of example, a total of 5 minutes of sonication time may be applied in 5 one minute intervals for any given bilayer in which sonication is applied. In one embodiment, each interval may not be equal in time length to the others (e.g., shorter or longer intervals as the beginning relative to the end).

The sonic energy may be applied via a suitable sonic apparatus, such as an ultrasound apparatus. In an embodiment, the frequency of the sonic energy applied may be about 10 kHz to about 150 kHz, about 15 kHz to about 50 kHz, about 20 kHz to about 30 kHz, or about 20 kHz to about 25 kHz. The amplitude or power of sonic energy applied may be about 20 Watts to about 800 Watts, about 50 Watts to about 200 Watts, about 100 Watts to about 300 Watts (e.g., about 150 Watts), or about 400 Watts to about 600 Watts.

Application of sonic energy during application of one or more of the polymer/shell particle bilayers narrows the particle size distribution of the resulting plurality of composite particles. The inventors currently believe that sonication after the initial polymer deposition helps prevent or limit the coated core particles from agglomerating, which allows more uniform coating by the shell particles. The inventors also currently believe that sonication after applying the shell particles causes shell particles that are weakly adhered to the polymer layer to fall off the core particle, which also promotes a more uniform coating of the shell particles. One or both of these phenomenons are believed to promote a narrower particle size distribution for the composite particles so formed.

In an embodiment, the distribution of composite particles is such that at least about 25% of the composite particles by volume lie within ±20% of a desired target particle diameter.

In another embodiment, the particle size distribution of composite particles is such that at least about 50% of the composite particles by volume lie within ±20% of a desired target particle diameter. In another embodiment, the particle size distribution of composite particles is such that at least about 60% of the composite particles by volume lie within ±20% of a desired target particle diameter. In certain embodiments, the average particle size of the plurality of composite particles may be about 1 μm to about 10 μm (e.g., about 1 μm to about 6 μm, 2 μm to about 6 μm, or about 3 μm to about 5 μm) and the standard deviation may be about 1 μm to about 4 μm (e.g., about 1.5 μm to about 3.5 μm, or about 3 μm). As will be seen hereafter, very narrow particle size distributions can be achieved with sonication, particularly where sonication is applied as part of each bilayer application (e.g., 80% of the particles by volume lying within ±20% of a desired target particle diameter).

Once the polymer has been attached to the surface of the core particles, there are numerous chemical reactions that may be performed, including cross-linking and curing. The cross-linking and/or curing may be carried out separately at any of the steps described in method 100. In one embodiment, curing may be performed for each step that results in the formation of a porous shell layer. In one embodiment, cross-linking is carried out as a final step 170. However, the step 170 is optional and embodiments also include the use of polymers that do not require curing and/or cross-linking. Cross-linking increases the mechanical stability of the stationary phase particles.

In embodiments where curing and/or cross-linking is performed, the polymer coating may be cured and/or cross linked using any suitable technique such as thermal curing and/or radiation curing such as curing using infrared or ultraviolet curing lights. Curing may increase the physical and/or chemical stability of the polymer coating. For example, curing may increase the stability of the polymer coating when exposed to harsh conditions, such as high and/or low pH solutions, which may allow a stationary phase including the porous composite particulate material to be cleaned and/or otherwise used under harsh conditions. Some porous composite particulate materials described herein may be used in combination with strong solvents, high pH conditions, and/or low pH conditions. The ability to clean a column under harsh conditions may enable reuse of a previously contaminated stationary phase. In at least one embodiment, curing may cause amide linkage to form between various compounds in the polymer coating. Additionally, curing may cause amide or other linkages to form between various chemical moieties in the polymer coating and the surface of the acid-base-resistant particles.

In additional embodiments, a polymer in the coating may be allowed to react with another compound in the coating before, during, and/or after depositing the coating on the acid-base-resistant particles to increase the molecular weight of the coating. Increasing the molecular weight of the polymer may be advantageous in that the higher molecular weight coating may have increased stability in a variety of conditions.

Surprisingly, in one embodiment, the polymeric material may be applied to the core particles and/or the shell particles as a neutral polymer. The neutral polymers are able to encapsulate and hold the particles together without ionic interactions between the polymer and the particles. However, in some embodiments, a neutral polymer, such as polyallylamine (PAAm), may bind through ionic interactions.

In additional embodiments, the coating and/or at least a polymeric compound forming the coating may be cross-linked during a curing process, such as a thermal and/or pressure-induced curing process, as described above. Additionally, the curing of the coating and/or at least a polymeric compound forming the coating, may be cross linked by exposing the coating to radiation. Cross-linking may cause stable bonds to form with amine groups and/or other chemical moieties in a polymeric compound in the coating, thereby increasing the stability of coating. Additionally, cross-linking compounds in the coating using compounds having epoxy groups may produce hydroxyl groups in and/or on the coating, resulting in a change in chemical characteristics of the coating and providing potential reactive sites on the coating. In one embodiment, the cross-linking produces a carbon-nitrogen bond, which has been found to work well for bonding together the relatively inert core and shell particles of the composite materials disclosed herein.

In certain embodiments, a cross-linking agent having at least two functional bonding sites may be used to effect cross-linking of at least a portion of the coating and/or at least a polymeric compound forming the coating. For example, a cross-linking agent may comprise a diepoxide compound having at least two epoxide groups, each of which may bond with an amine group. A cross-linking agent having at least two functional bonding sites may bond with at least one amine group on at least two or more polymeric molecules and/or compounds. In an additional embodiment, a cross-linking agent having at least two functional bonding sites may bond with at least one amine group on at least two separate sites on a single polymeric molecule. Additionally, a cross-linking agent having at least two functional bonding sites may bind to a polymeric compound forming the coating at only one of the at least two functional binding sites.

Examples of cross-linking agents suitable for cross-linking the polymer coating and/or at least a polymeric compound forming the polymer coating may include any type of compound containing two or more amine reactive functional groups, including, for example, diisocyanates, diisothiocyanates, dihalides, diglycidyl ethers, diepoxides, dianhydrides, dialdehydes, diacrylates, dimethacrylates, dimethylesters, di- and/or triacrylates, di- and/or trimethacrylates, and/or other diesters. In at least one embodiment, acrylates and/or methacrylates may react with an amine by Michael addition.

In addition, suitable cross-linking agents may include, without limitation, 1,2,5,6-diepoxycyclooctane, phenylene-diisothiocyanate, 1,4-diisocyanatobutane, 1,3-phenylene diisocyanate, 1,6-diisocyanatohexane, isophorone diisocyanate, diethylene glycol diglycidyl ether, 1,4-butanediol diglycidyl ether, bisphenol A diglycidyl ether, poly(ethylene glycol) diglycidyl ether, polypropylene glycol) diglycidyl ether, octanedioic acid dichloride (suberic acid dichloride), phthaloyl dichloride, pyromellitic dianhydride, 1,3-butadiene diepoxide, p-phenylene diisothiocyanate, 1,4-dibromobutane, 1,6-diiodohexane, glutaraldehyde, 1,3-butanediol diacrylate, pentaerythritol triacrylate, pentaerythritol tetraacrylate, dipentaerythritol pentaacrylate, 1,6-hexanediol dimethacrylate, and/or propoxylated (3) glyceryl triacrylate. Cross-linking agents may additionally comprise at least one functional group suitable for bonding with non-amine functional groups that may be present on polymers in the coating disclosed herein. The cross-linking agents may also include two or more functional groups, which may be the same or different. For example, the cross-linking agent may include molecules that have an acrylate and a methacrylate group, or a glycidyl group and a methacrylate group.

Generally, the polymer coating may be at least partially cross-linked. In one embodiment, the cross-linking exhibited by the polymer coating may be about 1% to about 99%, at least about 70%, about 55% to about 75%, about 75% to about 95%, at least about 85%, at least about 95%, or even at least about 99%. However, in some embodiments, the cross-linking may be less than about 99%, less than about 95%, or less than 85%, which may be useful so that the polymer coating exhibits a sufficient toughness to avoid cracking during use and/or handling. In some embodiments the crosslinking may be in a range from 1% to 99%.

In at least one embodiment, an epoxide compound such as, 1,2,5,6-diepoxycyclooctane, may have at least one highly strained epoxide ring that may be reactive with various amine groups in the polymer coating. Various alcohols may be used as effective solvents for amine-epoxide reactions. Reaction of the at least one highly strained epoxide ring with an amine group in the coating may result in immobilization of hydrophobic cyclooctyl rings and hydrophilic hydroxyl groups in the coating, leading to the formation of a mixed-mode stationary phase in the coating. This type of mixed-mode stationary phase may be employed for various uses, including, for example, retention of proteins and small molecules such as drugs under reverse phase and/or normal conditions in an SPE column.

The amine group is an extremely versatile chemical reagent with a rich chemistry. Information about some of these reactions may be found in U.S. patent application Ser. No. 12/040,638 filed on 29 Feb. 2008, entitled, "Functionalized Diamond Particles And Methods For Preparing The Same," naming Matthew R. Linford and Gaurav Saini as inventors, which is hereby incorporated herein, in its entirety, by this reference.

FIG. 2 describes another embodiment of a method 200 in which all or a portion of the acid-base-resistant shell particles are coated with polymer material prior to being adhered to the core particles or to each other (e.g., in a layer-by-layer process described above). In method 200, step 210 includes applying a polymer coating to acid-base-resistant shell particles to yield coated particles 214. In step 220, acid-base-resistant core particles 222 are mixed with the shell particles 212 using any suitable mixing process. The polymer coating on the coated shell particles 214 bonds the shell particles 212 to the core particles 222 to yield an intermediate composite particle 224. Additional layers of shell particles may be bonded to intermediate composite particle 224 by adding a second portion of uncoated shell particles 212, followed by a third portion of coated shell particles 214 or alternatively by coating the composite particles 224 with polymer material and shell particles as described in steps 110 and 120. As with method 100 of FIG. 1, sonication may be applied at any time during application of the polymer/shell particle bilayer. For example, sonication may be applied to either core particle 222, shell particles 214, or both before contacting coated shell particles 214 with core particle 222. In another embodiment, sonication may be applied at the end of application of the bilayer. More than one bilayer may be applied, as in FIG. 1. The method 200 may also include additional curing and/or cross-linking steps as described above with regard to the method 100. In an embodiment, characteristics of both methods 100 and 200 may be employed (e.g., application of a given bilayer as in FIG. 2, and application of another bilayer as in FIG. 1).

In one embodiment, the porous composite particulate material may include a body of bonded composite particles. The body may be formed by forming a bed of coated intermediate composite particles (e.g., composite particles 224) and polymerizing or otherwise joining the individual composite particles together to form a coherent body. Forming a body of bonded composite particles may better allow the individual particles to maintain their integrity.

In other embodiments, some of the core particles may be coated with polymer material and some of the core particles may be uncoated. Also some of the shell particles may be coated with polymer material and some of the shell particles may be uncoated. In such an embodiment, the coated/uncoated core particles may be mixed together with the coated/uncoated shell particles to form a plurality of composite particles.

FIG. 3 describes a method for forming a body of bonded composite particles in a vessel according to another embodiment. In this embodiment, a vessel 302 is provided that includes an inlet 304 and an outlet 306. A plurality of core particles are positioned within the vessel 302 to form a particle bed 308. The core particles may be retained in the vessel by a frit 310. In a first step, the vessel 302 is at least partially filled to form the bed 308. In a second step, the particles in the bed 308 are at least partially coated with a layer of polymer. In a third step, a suspension of shell particles is caused to flow through the bed 308, such as through voids between adjacent core particles. The shell particles bond to the core particles through the layer of polymer. Additional porous shell layers may be added as described above with regard to FIGS. 1 and 2. Sonication may be applied as described above during application of the one or more polymer/shell particle bilayers. The body may be formed by curing and/or cross-linking the intermediate composite particles so-formed while packed in the vessel as a bed. The bonded composite particles may exhibit improved structural integrity, which may help prevent shell particles from being freed during use of the porous composite particulate material in chromatography.

III. Porous Composite Particulate Materials

The porous composite particulate materials described herein provide desired sizes, porosity, surface areas, and chemical stability suitable for chromatography and SPE techniques. When used in chromatography and SPE, high-resolution separation may be achieved with relatively low back pressure.

The porous composite particulate materials include a plurality of composite particles, with each composite particle including a core particle at least partially surrounded by one or more layers of shell particles. The shell particles are bonded to the core particles by a polymer coating. The shell particles and/or core particles may be made from the acid-base-resistant materials described above, including but not limited to diamond particles, graphitic carbon, glassy carbon, silicon carbide, boron nitride, tungsten carbide, niobium carbide, a binderless carbide (e.g., binderless tungsten carbide), and combinations thereof. Examples of other acid-base-resistant materials include zirconia, noble metals, acid-base stable highly cross-linked polymers, titania, alumina, thoria or combinations of the foregoing. The porous composite particulate material may also have any combination of polymers described above. However, in an embodiment, the polymer coating that bonds the core particles to the shell particles and/or the shell particles to themselves is an amine polymer.

The composite particles may be provided in the form of finely divided discrete particles (e.g., a powder). Alternatively, the composite particles may be provided as a body of bonded composite particles. When the composite particles are provided as a body of bonded composite particles, the body may exhibit dimensions suitable for use in a separation apparatus, such as, but not limited to, separation devices used in HPLC.

In one embodiment, the composite particles have a particle size in a range from less than 0.5 µm, about 0.5 µm to 500 µm, more specifically about 1 µm to 200 µm, or even more specifically in a range from about 1 µm to about 150 µm. In one embodiment, the composite particles have a particle size in a range from about 1 µm to about 10 µm, or more specifically about 1.5 µm to about 7 µm. This particle range may be particularly useful for HPLC applications and the like. In another embodiment, the composite particles can have a particle size can be in a range from about 5 µm to about 500 µm, or more specifically in a range from about 10 µm to about 150 µm. This larger particle range may be more suitable for use in solid phase extraction applications and the like.

The composite particles may include a desired surface area. The surface area may depend on core and shell particle size, number of porous shell layers, and particle geometry. However, the surface area of the composite particles is higher than a similarly sized core particle due to the additional surface area provided by the shell particles. In an embodiment, the surface area may be measured using the Brunauer Emmett and Teller ("BET") technique and is in a range from 1-500 $m^2/g$ for composite particles having a particle size in a range from about 1 µm to 500 µm, more specifically in a range from 25-300 $m^2/g$, or even more specifically 50-200 $m^2/g$. In one embodiment, the composite particles have a particle size in a range from about 0.5 µm to 10 µm may have a surface area in a range from about 10-500 $m^2/g$, more specifically in a range from 25-200 $m^2/g$, and even more specifically in a range from 25-60 $m^2/g$. In another embodiment, composite particles having a particle size of at least about 0.5 µm (e.g., about 10 µm to 250 µm) may have a surface area of at least about 5 $m^2/g$ (e.g., about 5-200 $m^2/g$, more specifically about 10-100 $m^2/g$, or even more specifically about 50-150 $m^2/g$). In yet another embodiment, composite particles having a particle size in a range from about 250 µm to about 500 µm may have a surface area at least about 5 $m^2/g$, and even more specifically at least about 10 $m^2/g$ for composite particles with a particle size in a range from about 250 µm to about 500 µm.

In a more detailed embodiment, a composite particle including a diamond core particle having a size of about 2.5 µm to about 5 µm and 1-50 porous shell layers of diamond shell particles having a particle size of about 5 nm to about 50 nm may have a surface area of about 1 $m^2/g$ to about 60 $m^2/g$. In a more specific embodiment, a composite particle including a diamond core particle having a size of about 2.5 µm and 10-50 porous shell layers of diamond shell particles having a particle size of about 5 nm to about 10 nm may have a surface area of about 14 $m^2/g$ to about 60 $m^2/g$. In another more specific embodiment, a composite particle including a diamond core particle having a size of about 5 µm and 10-50 porous shell layers of diamond shell particles having a particle size of about 5 nm to about 10 nm may have a surface area of about 7 $m^2/g$ to about 33 $m^2/g$.

FIG. 4 illustrates a composite particle that includes a plurality of polymer layers according to another embodiment. A first polymer coating 402 may be applied on an acid-base-resistant core particle 404. The polymer coating 402 and shell particles 403 may be formed using steps 110 and 120 as described above. Another polymer layer is formed by adding a functional polymer layer 406 and a second polymer coating layer 408. The polymer layers 402 and 408 are binding layers selected for bonding the shell particles to the core particles and/or the shell particles to the shell particles. The functional layer 406 is a polymeric layer that imparts a desired functionality to the composite particle. The polymers that are used to make the functional layer 406 may be selected from the polymers mentioned above that are useful for forming layers 402 and 408. However, the use of multiple polymer layers allows the selection of two or more different polymers to form the composite thereby allowing the different polymer layers to be optimized for different purposes. Typically, the layers 402 and 408 are selected for bonding polymers together and the functional polymer layer 406 is selected for providing a separate function such as, but not limited to properties related to separation efficiency. In one embodiment, the functional polymer layer 406 may be an anionic polymer.

In some embodiments, an additional particulate component may be embedded in the porous shell layers of the shell particles. The additional particulate component may be any organic or inorganic material that provides a desired property to the porous composite particulate material. In one embodiment, the additional component may be initially included in the manufacture of the composite particles but then removed. For example, the porous shell layers may include silica particles that exhibit a selectivity to be removed over more acid-base-resistant particles, such as diamond, graphite, or boron nitride shell particles. This method may allow a composite particle to be formed with particular structural features. Alternatively, the additional component may be included with the purpose of removing or eluting out the component during use. For example, the additional component may be configured to elute out over time in the presence of a mobile phase.

In one embodiment, the additional component may be a particle that has affinity for a drug or other chemical reagent. In one embodiment, the additional component may include a catalytic reagent. The additional component may be included in the core particles and/or the layers of shell particles.

IV. Separation Apparatuses and Methods

Figure 5:
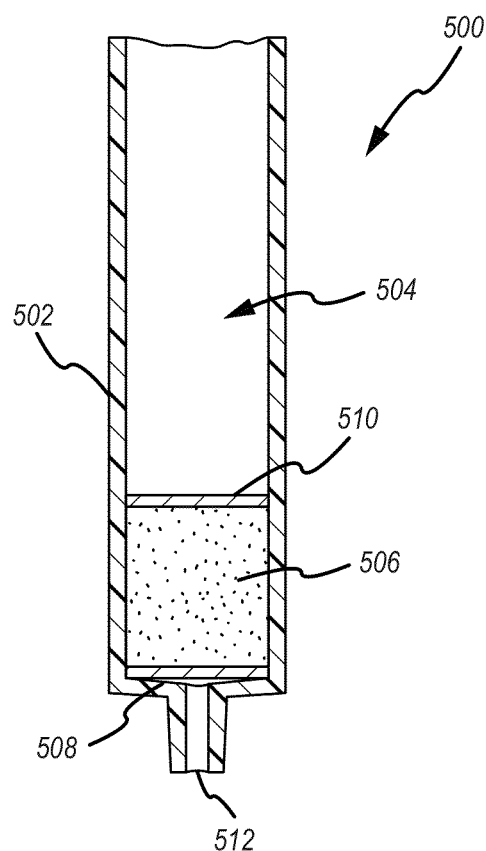
FIG. 5 is a cross-sectional view an embodiment of a separation apparatus including porous composite stationary phase particles comprising any of the composite particulate materials disclosed herein.

FIG. 5 is a cross-sectional view of a separation apparatus 500 according to an embodiment. The separation apparatus 500 may include a column 502 defining a reservoir 504. A porous body 506 (e.g., a porous composite bed, porous disk, other porous mass, etc.) may be disposed within at least a portion of the reservoir 504 of the column 502. The porous body 506 may comprise any of the porous composite particulate materials disclosed herein in bonded or powder form. The porous body 506 is porous so that a mobile phase carrying an analyte mixture may flow therethrough. In various embodiments, a frit 508 and/or a frit 510 may be disposed in column 502 on either side of porous body 506. The frits 508 and 510 may comprise any suitable material that allows passage of a mobile phase and any solutes carried by the mobile phase, while preventing passage of the composite particulate material present in porous body 506. Examples of materials used to form the frits 508 and 510 include, without limitation, glass, polypropylene, polyethylene, stainless steel, titanium, and/or polytetrafluoroethylene.

The column 502 may comprise any type of column or other device suitable for use in separation processes such as chromatography and solid phase extraction processes. Examples of the column 502 include, without limitation, chromatographic and solid phase extraction columns, tubes, syringes, cartridges (e.g., in-line cartridges), and plates containing multiple extraction wells (e.g., 96-well plates). The reservoir 504 may be defined within an interior portion of the column 502. The reservoir 504 may permit passage of various materials, including various solutions and solvents used in chromatographic and solid-phase extraction processes.

The porous body 506 may be disposed within at least a portion of reservoir 504 of the column 502 so that various solutions and solvents introduced into the column 502 contact at least a portion of the porous body 506. The porous body 506 may comprise a plurality of substantially non-porous particles in addition to the composite porous material.

In certain embodiments, frits, such as glass frits, may be positioned within the reservoir 504 to hold porous body 506 in place, while allowing passage of various materials such as solutions and solvents. In some embodiments, a frit may not be necessary, such as the body of bonded-together composite particles as described above with reference to FIG. 3.

In one embodiment, the separation apparatus 500 is used to separate two or more components of an analyte mixture carried by a mobile phase by causing the mobile phase carrying the analyte mixture to flow through the porous body 506. The mobile phase is introduced through an inlet and cause to flow through the porous body 506 and the separated components may be recovered from the outlet 512.

In one embodiment, the mobile phase includes concentrated organic solvents, buffers, acids, or bases. In one embodiment, the mobile phase includes a concentrated acid with a pH less than about 3, more specifically less than about 2. In another embodiment, the mobile phase includes a base with a pH greater than about 9, more specifically greater than about 11, and even more particularly greater than 12.

In one embodiment, the separation apparatus 500 is washed between a plurality of different runs where samples of mixed components are separated. In one embodiment, the washing may be performed with water. In another embodiment, a harsh cleaning solvent is used. In this embodiment, the harsh cleaning solvent may be a concentrated organic solvent and/or a strong acid or base. In one embodiment, the cleaning solvent has a pH less than about 3, more specifically less than about 2. In another embodiment, the cleaning solvent has a pH greater than about 10, more specifically greater than about 12, and even more particularly greater than 13.

V. Examples

The following examples are for illustrative purposes only and are not meant to be limiting with regards to the scope of the specification or the appended claims. For example, the present disclosure and claims are not limited to the use of glassy carbon spherical core particles and nano-sized diamond shell particles, unless otherwise specified.

Reagents and Materials

Table 1 describes the chemicals and materials used to create and test various produced stationary phase composite particles.

TABLE 1

Chemicals and Materials Used

| chemical name | CAS No.[a] | manufacturer | location | purity |
|---|---|---|---|---|
| acetaminophen | 103-90-2 | Sigma-Aldrich | St. Louis, MO | BioXtra, ≥99.0% |
| acetonitrile | 75-05-8 | EMD | Gibbstown, NJ | HPLC grade |
| amitriptyline hydrochloride | 549-10-8 | Restek | St. Louis, MO | ≥98% |
| benzenoid hydrocarbon kit | | Supelco | St. Louis, MO | varied by analyte |
| 4-bromophenol | 106-41-2 | Sigma-Aldrich | St. Louis, MO | 99% |
| 2-tert-butyl-4-methylphenol | 2409-55-4 | Sigma-Aldrich | St. Louis, MO | 99% |
| 2-chlorophenol | 95-57-8 | Sigma-Aldrich | St. Louis, MO | 98% |
| 4-chlorophenol | 106-48-9 | Sigma-Aldrich | St. Louis, MO | ≥99% |
| cholesterol | 57-88-5 | Sigma-Aldrich | St. Louis, MO | approx 95% |
| clomipramine | 303-49-1 | Sigma-Aldrich | St. Louis, MO | ≥98% |
| cydohexanol | 109-93-0 | Fisher Scientific | Fair Lawn, NJ | reagent grade |
| diazepam | 439-14-5 | Sigma-Aldrich | St. Louis, MO | 98% |
| diazinon | 333-41-5 | Fluka | Steinheim, Germany | Pestanal, |
| 1,2,7,8-diepoxyoctane | 2426-07-51 | Sigma-Aldrich | St. Louis, MO | 97% |
| 2,6-diisopropylphenol | 2078-548 | SAFC Supply Solutions | St. Louis, MO | 97+% |
| doxepin hydrochloride | 1229-29-4 | Sigma-Aldrich | St. Louis, MO | |
| 1,2-epoxyoctadecane | 7390-81-0 | Alfa Aesar | Ward Hill, MA | technical grade, 90% |
| imipramine | 50-49-7 | Sigma-Aldrich | St. Louis, MO | BioXtra, a≥99.0% |
| isopropyl alcohol | 67-63-0 | Mallinckrodt Baker Inc. | Phillipsburg, NJ | ChromAR |
| methanol | 67-56-1 | Fisher Scientific | Fair Lawn, NJ | HPLC grade |
| 4-methylphenol | 106-44-5 | Supelco | St. Louis, MO | analytical standard |
| nanodiamondond | | Advanced Abrasives Corp. | Pannsauken, NJ | 8.32 wt %, 0-100 nm |
| phenol phenol | 108-95-2 | Sigma-Aldrich | St. Louis, MO | ~99% |
| poly(allylamine), | 30551-89-4 | Sigma-Aldrich | St. Louis, MO | 20 wt % in water |
| poly(allylamine), | 30551-89-4 | Sigma-Aldrich | St. Louis, MO | 20 wt % in water |
| spherical glassy carbon, | | Supelco | St. Louis, MO | prototype material, |
| tetramethylammonium | 75-59-2 | Sigma-Aldrich | St. Louis, MO | 24 wt % solution in water |
| triethylamine | 121-44-8 | Mallinckrodt Baker Inc. | Phillipsburg, NJ | 99.50% |
| Triton X-100 | 9002-93-1 | Fisher Scientific | Fair Lawn, NJ | electrophoresis grade |
| water | 7732-18-5 | From a Millipore system | Billerica, MA | 18 MΩ resistivity (Milli-q |
| xylenes | 1330-20-7 | Mallinckrodt Baker Inc. | Phillipsburg, NJ | ACS grade |

Empty stainless steel HPLC columns (30 mm×4.6 mm i.d. with 0.5 μm frits) were obtained from Restek, Bellefonte, Pa., and 50 mL centrifuge tubes were obtained from Sarstedt, Newton, N.C. All analyte solutions were prepared by mixing about 20 μL of an analyte in 15 mL of acetonitrile.

Instrumentation

HPLC instrumentation included a dual wavelength detector (Model No. 2487), a binary HPLC pump (Model No. 1525), and a column oven (Model Number SCH) all from Waters Corporation, Milford Mass. The LC system was run using Breeze, Version 3.3 Software. To calculate efficiencies, the software measured the full width at half-maximum (fwhm) of a peak and employed the equation, $N=5.54(Rt/W_{1/2})^2$. Separations performed at the University of Tasmania were done using a Waters Alliance HPLC. A dual wavelength detector (Model No. 2487) was used for detection and the pump, autosampler, and column oven were all part of a 2695 Separations Module. The system was run using Empower, Version 2 software and efficiencies were calculated using the fwhm method.

Column Packer: Pack-in-a-Box, 10,000 psi pump (Chrom Tech, Inc., Apple Valley, Minn.). All separations were performed under isocratic conditions. For the high and low pH separations, the pH of the water was set to 11.3 by addition of 0.1% (v/v) triethylamine; 13.0 by addition of tetramethylammonium hydroxide; or 2.7 by addition of formic acid. Analytes were injected using a 20 μL, sample loop.

Scanning electron microscope: Philips XL30 ESEM FEG (FEI Corporation, Hillsboro, Oreg.). Samples for SEM were prepared by placing a slurry of particles directly on a stub and then drying the samples in an oven. Imaging was done under high-vacuum conditions with a spot size of 3 (This is an arbitrary number commonly used in SEM that has no units. This number represents the size of the aperture that allows electrons through for imaging).

Surface area analyzer (Brunauer-Emmett-Teller (BET) isotherm measurements): Micromeritics TriStar II (Micromeritics Instrument Corporation, Norcross, Ga.). Specific surface areas of the samples were determined from $N_2$ adsorption at 77 K. The samples were degassed at 200° C. for 12 hr. prior to data collection.

Particle size distribution analyzer: Beckman Coulter LS 13 320 Multi-Wavelength Particle Size Analyzer (Beckman Coulter, Inc., Brea, Calif.). Particle size distributions were obtained by placing drops of a suspension of particles in an analysis bath.

X-ray photoelectron spectroscopy (XPS) was performed with an SSX-100 instrument from Surface Sciences (maintained by Service Physics in Bend, Oreg.) using an Al Kα source and a hemispherical analyzer. An electron flood gun was employed for charge compensation, and this charge compensation was further enhanced with a fine Ni mesh approximately 0.5-1.0 mm above the surface of the sample. Survey scans, as well as narrow scans, were recorded with an 800 μm×800 μm spot. Carbon powders were mounted onto double-sided tape adhered to silicon wafers for XPS analysis.

Static time-of-flight secondary ion mass spectrometry (ToF-SIMS) was performed on an ION TOF IV instrument (Munster, Germany) with a 25 keV Ga$^+$ source and a 200 μm×200 μm sample area. For ToF-SIMS analysis, the carbon powders were mounted onto double-sided tape adhered to silicon wafers.

Raman spectroscopy was performed on a Chromex Raman 2000 instrument (Billerica, Mass.) with a 532 nm laser, the CCD was cooled to −40° C., and the slit width was set at 100 μm. Raman spectra were obtained using conventional methods; loose powder was placed in a sample vessel and analyzed.

Particle Preparation

Particles were prepared using a layer-by-layer ("LbL") procedure. About 0.5 g of spherical carbon particles, about 3 μm in diameter were suspended in 40 mL of a 1:1 water: methanol ($H_2O$:MeOH) mixture containing 3.3 mL of a 65,000 $M_w$ poly(allylamine) (PAAm) solution, as obtained from the vendor. The particles were stirred for 24 hr. in this solution. The particles were then placed in a 50 mL screw cap plastic centrifuge tube, centrifuged at 5000 rpm, and rinsed three times with the 1:1 $H_2O$:MeOH solution. Nano-diamond (1.5 mL of a 8.32 wt % slurry) was then added to the PAAm coated particles that were suspended in about 40 mL of the rinse solution. The solution with the partially coated particles and nano-diamond was shaken by hand for 5 min and allowed to settle for 1 min. It was then centrifuged and rinsed twice with the 1:1 $H_2O$:MeOH mixture to remove excess nano-diamond from the particles. To these particles, now coated with a layer of PAAm and nano-diamond, was added 1.5 mL of a 7.5 wt % aqueous solution of PAAm (17,000 $M_w$).

The particles were again agitated by hand for 5 min and allowed to settle for 1 min. Excess PAAm was removed by centrifuging the particles and rinsing three times with the same $H_2O$:MeOH mixture. Deposition of nano-diamond (8.32 wt % slurry) and PAAm (17,000 $M_w$) was subsequently performed in alternating steps until the desired thickness of the porous shell was reached, terminating in a PAAm coating. Sixty discrete depositions were performed to form the polymer-nano-diamond bilayer shell (i.e., 30 polymer depositions and 30 nano-diamond depositions). The resulting 4 μm composite particle included a 0.5 μm thick shell, formed by applying 30 bilayers. There appeared to be an induction period in which the surface was only partially covered during application of the first few bilayers, after which deposition appeared to proceed with greater regularity. The thickness was measured periodically during particle growth by scanning electron microscopy.

Sonication

In an effort to improve the particle size distribution, two other batches of particles were prepared. One batch of core particles was sonicated after the initial PAAm deposition, but prior to nano-diamond deposition, using a Sonifier Cell Disruptor (Heat Systems Co., Model: W1850, Melville, N.Y.). The particles were sonicated in 1 min intervals until they had been sonicated for a total of 5 min. Sonication was performed with the particles in the centrifuge tube that would later be used for deposition. Between sonications, the centrifuge tube was immersed in ice water for 1 min to prevent overheating of the sample. Other than this initial sonication, the particles were functionalized, cross-linked, and tested in the same manner as the previous batch of cross-linked particles. This resulted in particles with an improved particle size distribution (PSD) over the previous, non-sonicated batch.

Another batch of particles was prepared where sonication was performed after every PAAm deposition until the desired shell thickness was reached. Otherwise, these particles were prepared in the same manner as the previous batches. This approach yielded the tightest PSD of the three preparation methods.

Compared to the uncoated particles, all of the syntheses procedures for applying nano-diamond particles resulted in a significant increase in the mass and volume of the particles after the layer-by-layer depositions.

Particle Functionalization

Core-shell composite particles made through deposition of 30 PAAm/nano-diamond bilayers, and terminated with a PAAm coating, were rinsed three times in 2-propanol and three times in 1:1 cyclohexanol:xylenes. The particles were then placed in about 15 g of the cyclohexanol:xylenes solution to which functionalizing agents were added. To prepare a non-cross-linked phase, 10 wt % of 1,2-epoxyoctadecane was added. This was reacted with the particles in a round-bottom flask, which was fitted with a water-cooled condenser and heated to 130° C. for 54 hr. For the cross-linked phase both 10 wt % of 1,2-epoxyoctadecane and 0.5 wt % of 1,2,7,8-diepoxyoctane were added. The diepoxide served as the cross-linker. The reaction conditions were the same in the preparation of the cross-linked and the non-cross-linked particles.

The reaction mixtures were allowed to cool to room temperature. Excess functionalizing reagent was removed by rinsing and centrifuging three times with the cyclohexanol:xylenes solution, three times with 2-propanol, and three times with a 1% (v/v) aqueous solution of Triton X-100.

Particle Sieving

After particle functionalization, the particle size distribution was measured. In the nonsonicated material, there were about 100 μm agglomerates. Because of this, the particles, in an aqueous solution of Triton X-100 (1% v/v) which worked as a dispersant, were passed through a 40 μm sieve, which removed most of the larger agglomerates. Although improved, the particle size distribution was still far from uniform (see FIG. 18A). After sieving, the particles were concentrated by centrifugation.

Column Packing

Packing was performed by suspending the particles in 12 mL of an aqueous solution of Triton X-100 (1% v/v). The Triton solution was also used as the pushing solution during packing The slurry was poured into the packing chamber which had a 30 mm×4.6 mm i.d. column attached at its end. The maximum packing pressure was set at 7000 psi (8500 psi for the sonicated particles). Packing occurred over a 25 min period and the pressure was released gradually over a 30 minute period.

Another column (50 mm×4.6 mm i.d.) was packed at the University of Tasmania using a pump from Haskel (Burbank, Calif.). The particles were suspended in 2-propanol and packed at 8000 psi until 25 mL of packing solvent had passed through the column. An insufficient volume of particles was used on the first attempt, so the column was repacked with a mixture of new and previously packed $d_p$=4 μm particles. This second attempt was successful.

Stability Tests

Two stability tests were performed on the cross-linked material. The first was run under the following conditions: flow rate, 0.5 mL/min, mobile-phase composition, 40:60 $H_2O$:ACN with 0.1% (v/v) triethylamine in the aqueous portion of the mobile phase to set the pH at 11.3; temperature, 35.0° C. The test occurred over 1600 column volumes. A stability test at pH 13.0 was then performed on this column. The mobile phase was 40:60 $H_2O$:ACN, with 1% (v/v) of the tetramethylammonium hydroxide solution (Table 1) in the aqueous component to raise the pH to 13. The column temperature was 35.0° C. The test occurred over 1000 column volumes. The analytes used for these tests were from a benzenoid hydrocarbon kit and included benzene, ethylbenzene, n-butylbenzene, and n-hexylbenzene. After the stability tests, the HPLC system was flushed with ACN or MeOH and water for many minutes to remove the corrosive material that might damage the pump and/or detector flow cell. After use, the columns were also flushed with the same mobile phase and stored under MeOH between uses.

UHPLC and Sandwich Injection

An UHPLC system, Agilent Infinity 1290, with a diode array detector (Model No. G4212A, detection at 254 nm), an LC pump (Model No. G4220A), a column oven (Model No. G1316C), and an autosampler (Model No. G4226A), was used. This system was run with Chem Station Software, version B.04.03, and measurement of the fwhm by the software was used to calculate efficiencies. A "sandwich" injection on this system was performed using a mixture of alkylbenzenes. To with, a 5 μL sample of an alkylbenzene analyte mixture was injected between 7 μL volumes of water onto the $d_p$=4 μm column (see FIG. 18C) at 80° C. using a pH 11.3 mobile phase, with a flow rate of 1.0 mL/min.

Characterization of Core Particles and the LbL Process

Figure 6A:
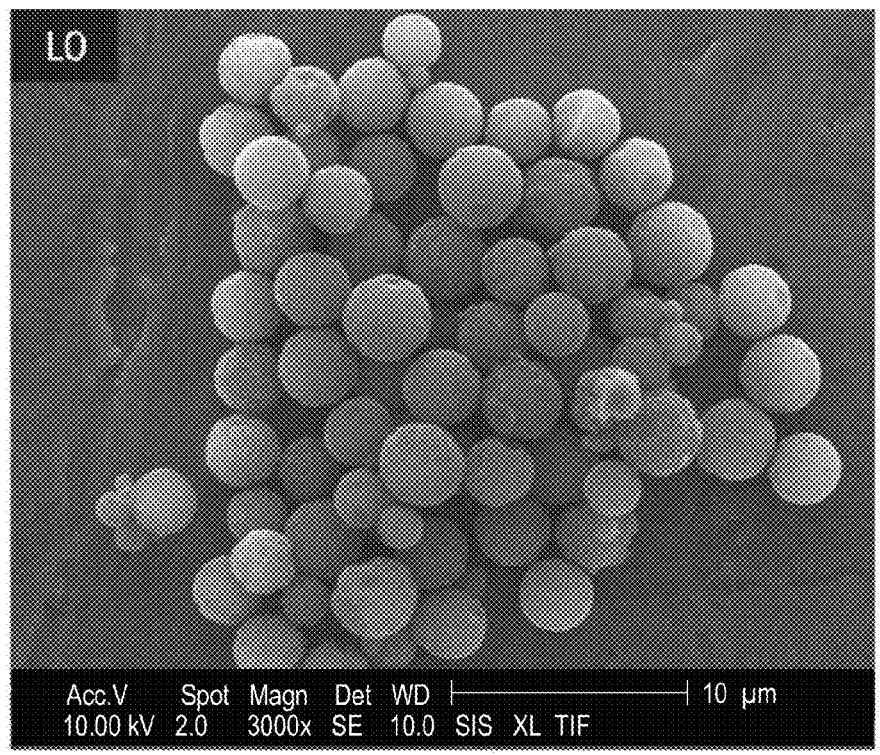
FIG. 6A is an SEM image of exemplary spherical glassy carbon core particles.
Figure 6B:
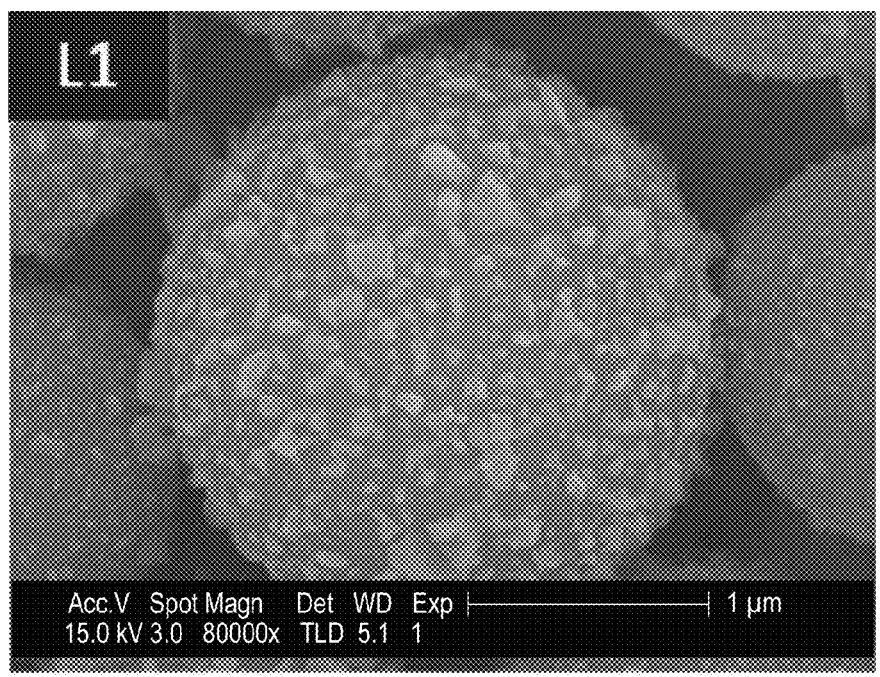
FIG. 6B is an SEM image of a spherical glassy carbon core particle once a bilayer of PAAm and nano-diamond shell particles have been deposited thereon.
Figure 6C:
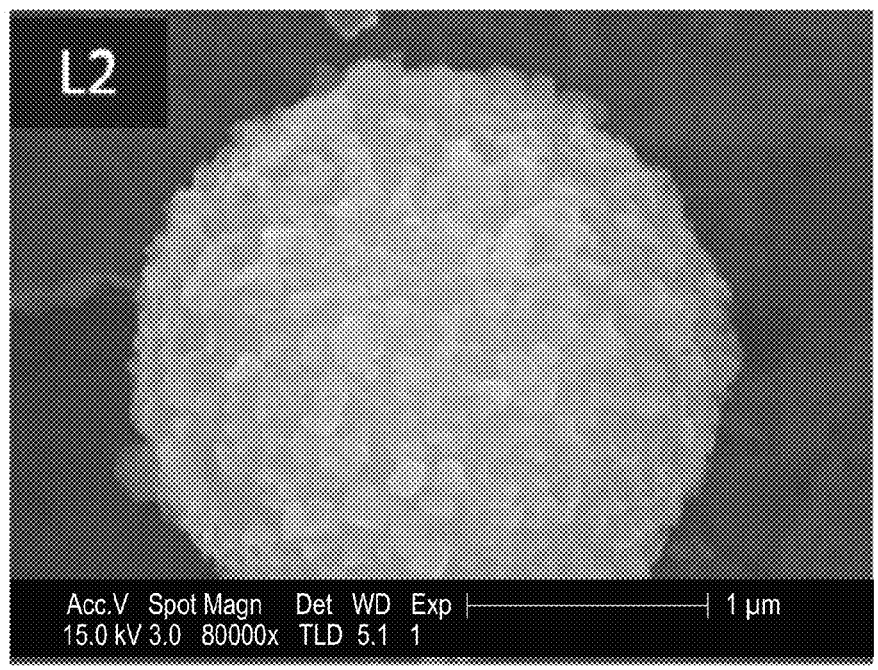
FIG. 6C is an SEM image of a spherical glassy carbon core particle once two bilayers of PAAm and nano-diamond shell particles have been deposited thereon.
Figure 6D:
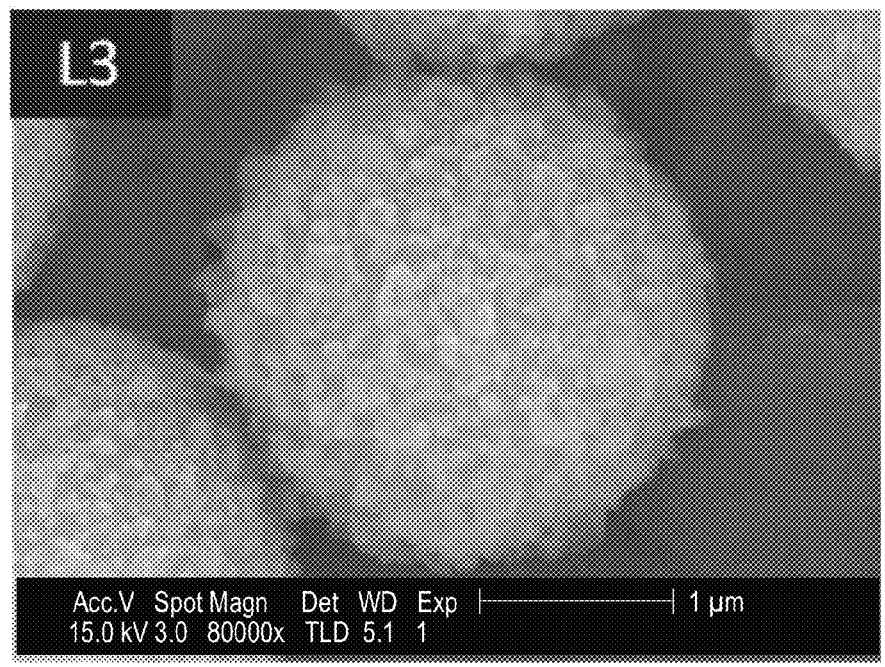
FIG. 6D is an SEM image of a spherical glassy carbon core particle once three bilayers of PAAm and nano-diamond shell particles have been deposited thereon.
Figure 6E:
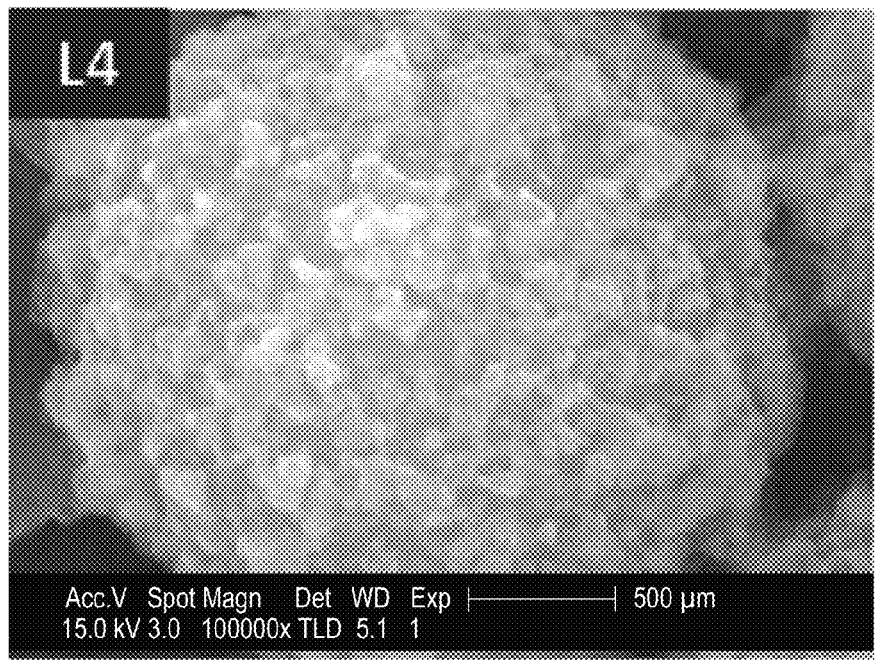
FIG. 6E is an SEM image of a spherical glassy carbon core particle once four bilayers of PAAm and nano-diamond shell particles have been deposited thereon.
Figure 6F:
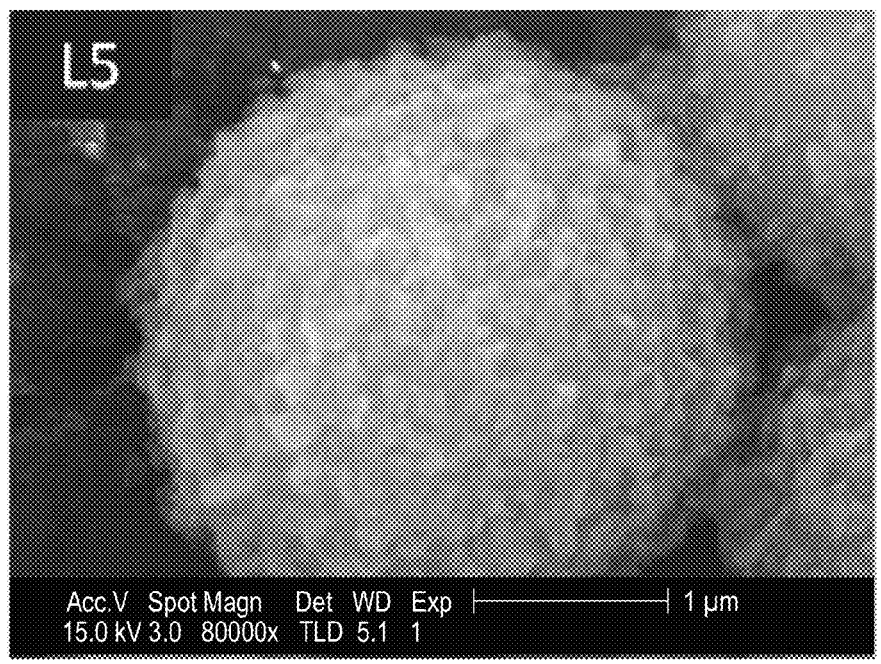
FIG. 6F is an SEM image of a spherical glassy carbon core particle once five bilayers of PAAm and nano-diamond shell particles have been deposited thereon.
Figure 6G:
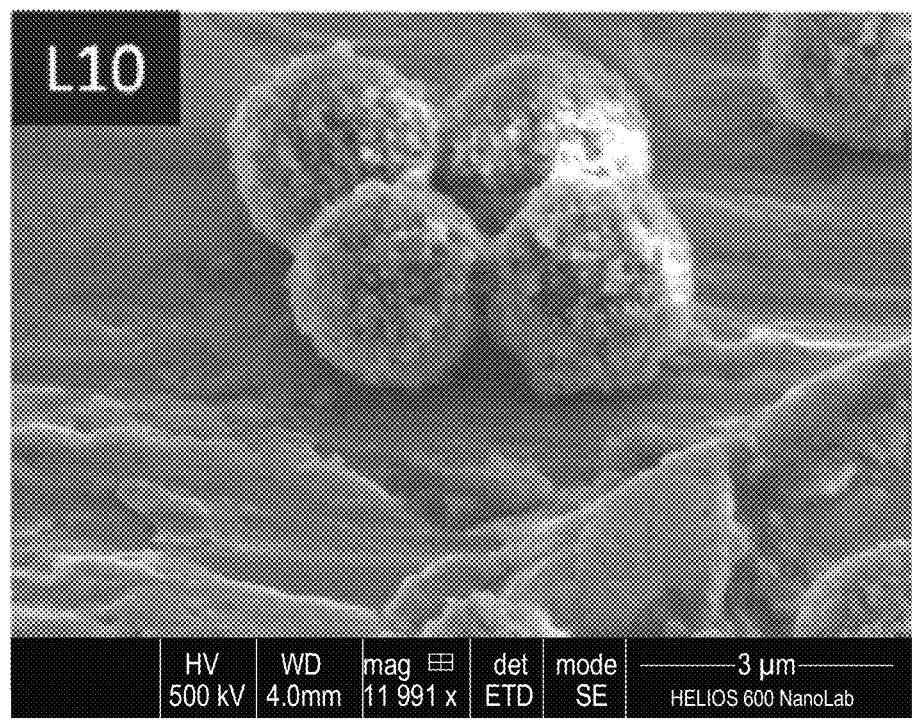
FIG. 6G is an SEM image of a spherical glassy carbon core particle once ten bilayers of PAAm and nano-diamond shell particles have been deposited thereon.

The glassy carbon core particles were characterized by scanning electron microscopy (SEM), X-ray photoelectron spectroscopy (XPS), time-of-flight secondary ion mass spectrometry (ToF-SIMS), and Raman spectroscopy. SEM showed that the glassy carbon cores were largely spherical (FIG. 6A).

Figure 7:
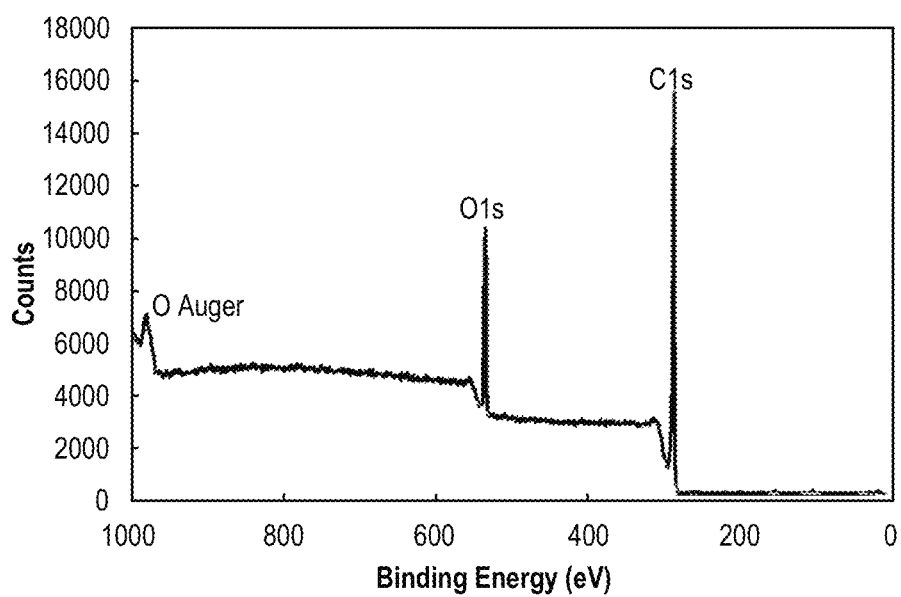
FIG. 7 is a graph showing XPS characterization of spherical carbon core particles.

XPS analyzes the upper approximately 10 nm of a material, and gives insight into the elemental composition of surfaces of materials. An XPS survey scan (FIG. 7) of the core carbon material showed two main peaks from carbon (C1s) and oxygen (O1s), carbon comprising 83% of the surface, and oxygen the remaining 17%. These atomic percentages were acquired through XPS narrow scans. The presence of oxygen may aid in adherence of PAAm to the core particles.

Figure 8:
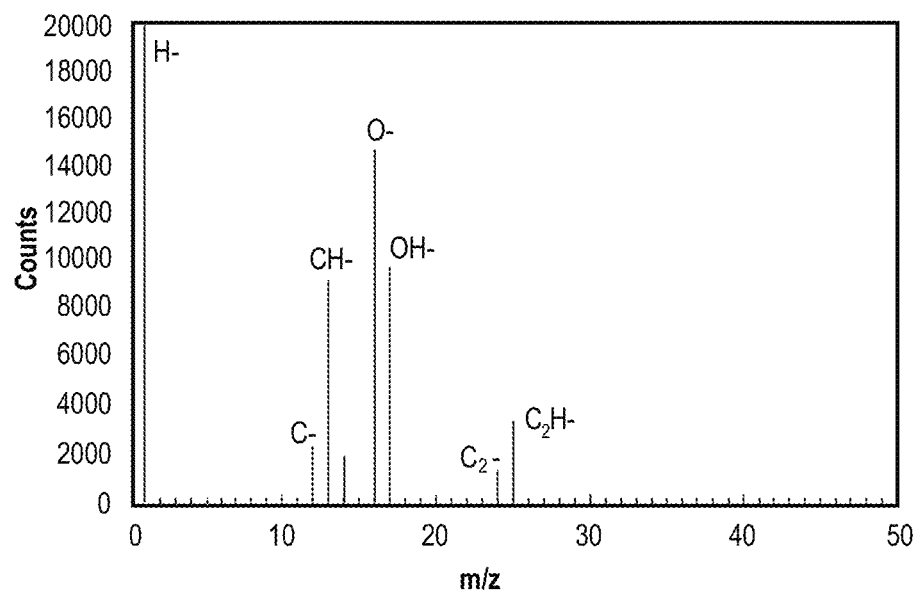
FIG. 8 is a ToF-SIMS negative ion spectrum of unfunctionalized spherical carbon core particles.

ToF-SIMS, a form of surface mass spectrometry, provides chemical information about the upper approximately 3 nm of a surface and is sensitive to all elements. Consistent with the XPS, negative ion ToF-SIMS of the core particles showed fairly intense $O^-$ and $OH^-$ peaks. It also showed the expected $C^-$, $CH^-$, $C_2^-$, and $C_2H^-$ signals (FIG. 8).

Figure 9:
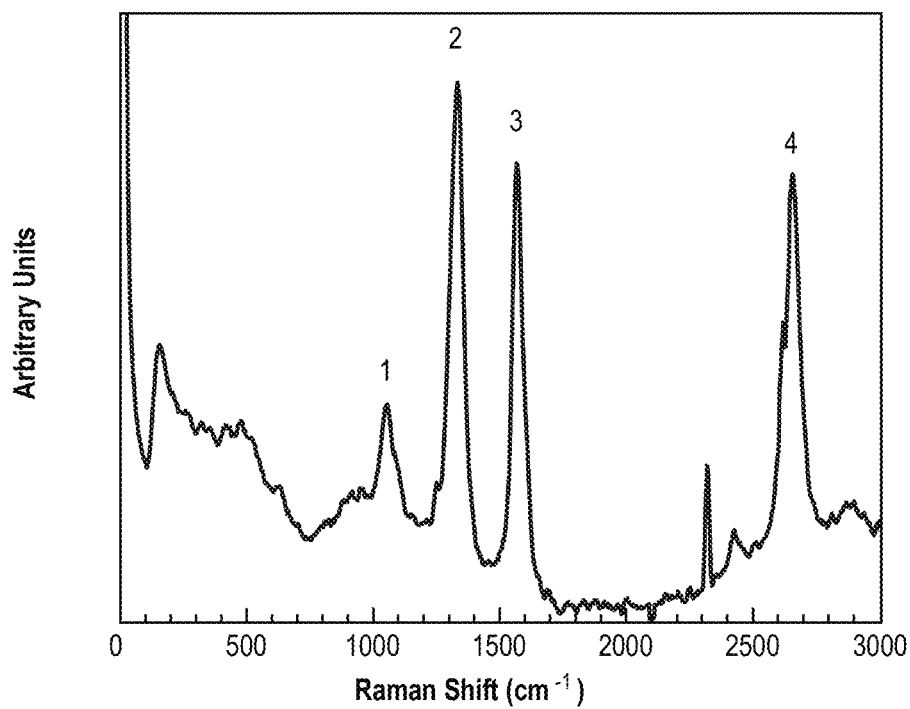
FIG. 9 is a Raman spectrum of spherical carbon core particles.

Raman spectroscopy gives the analyst information about the degree of $sp^3$- or $sp^2$-bonding in a bulk carbonaceous material. The Raman spectrum in FIG. 9 contains four distinct peaks labeled 1-4. Peak 1 represents the T band. It is centered around 1050 $cm^{-1}$ and can be assigned to $sp^3$-bonded carbon. Peak 2 is designated as the disorder-induced band (or D band). It is centered at approximately 1350 $cm^{-1}$ and is also due to $sp^3$-bonded carbon (diamond-like carbon). Peak 3 is designated as the G band and is centered around 1580 $cm^{-1}$. It is attributed to $sp^2$-bonded carbon (graphitic type bonding). Peak 4, which is centered around 2700 $cm^{-1}$, is the G' band, which is an overtone of the D band. It is clear from this spectrum that both $sp^2$- and $sp^3$-hybridized carbon are present in the glassy carbon particles.

To track and illustrate the coating process on a spherical carbon material, core-shell particles were prepared with nano-diamond larger than those used for the packed pellicular phases. This made it easier to follow the LbL process by SEM (see FIGS. 6A-6G). It is clear from FIGS. 6A-6G that the core material is nearly completely coated after five bilayer deposition cycles and that nano-diamond deposition progresses steadily from deposition to deposition. It should also be noted that, despite referring to the deposition process as "layer-by-layer," a complete layer is not necessarily obtained after each deposition, which is consistent with previous results. Finally, note that the spherical carbon material used to obtain the SEM images in FIGS. 6A-6G, is different from that employed for the packings used in the chromatographic studies in this paper. Nevertheless, the material shown in FIGS. 6A-6G is representative, as the LbL application of bilayers of PAAm and nano-diamond proceeds on micrometer-sized generally spherical glassy carbon particles.

Non-Cross-Linked, Hydrophobic Phase

The first batch of core-shell particles made from generally spherical carbon cores and bilayer PAAm/nano-diamond shells was not cross-linked. In the formation of these (and subsequent) particles, the PAAm was expected to deposit as an ultrathin film in a self-limiting fashion. The primary amines from the PAAm in the shell layer were only reacted with monofunctional 1,2-epoxyoctadecane resulting in a $C_{18}$ phase. Chromatography was performed on a column packed with this stationary phase using alkylbenzene analytes (1) benzene, (2) ethylbenzene, (3) n-butylbenzene, and (4) n-hexylbenzene. Mobile phase was 40:60 $H_2O$:ACN with 0.1(v/v) % triethylamine, pH 11.3. Flow rate 0.5 mL/min. Column temperature 35° C. Detection at 254 nm. Under all conditions explored, peaks showed a large amount of fronting regardless of analyte concentration. This may be due to non-uniform column packing Moreover, the non-cross-linked column showed a rapid increase in back pressure over a short period of time which indicated mechanical instability of this material.

During experimentation with this column, the flow rate was doubled from 0.5 to 1.0 mL/min. Upon returning to the original flow rate, the back-pressure had increased significantly from 2040 to 3620 psi. After this experiment, the back-pressure steadily increased over a 6 hr. period to 4570 psi. At this point, the experiment was terminated.

Cross-Linked, Hydrophobic Phases

The surface area of the cross-linked particles was 44.2 m$^2$/g as measured by BET isotherm measurements. The particles had a mean pore size of 28 nm and a pore volume of 0.356 cm$^3$/g.

To determine the effect of cross-linking, the stationary phase was reacted with 1,2-epoxyoctadecane under the same conditions as described above, but with the addition of a small amount of cross-linker: 1,2,7,8-diepoxyoctane. The resulting cross-linked stationary phase was then packed under the same conditions as the previous column. From the chromatography, it was immediately clear that this phase was less hydrophobic than the non-cross-linked phase, which would be consistent with the incorporation of the diepoxide into the stationary phase. That is, the diepoxide, which contains eight carbon atoms and will yield two hydroxyl groups upon reaction with PAAm, is less hydrophobic than 1,2-epoxyoctadecane, which contains eighteen carbon atoms and will only yield one —OH group when it reacts with PAAm.

Figure 10:
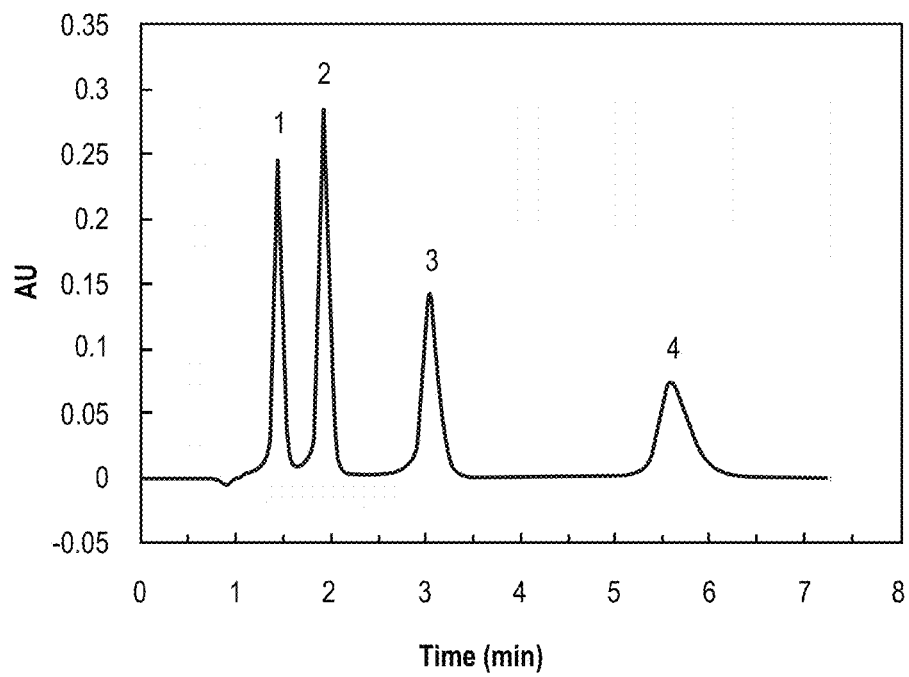
FIG. 10 is a graph showing a reversed-phase separation of alkylbenzenes through a non-cross-linked hydrophobic stationary phase.
Figure 11:
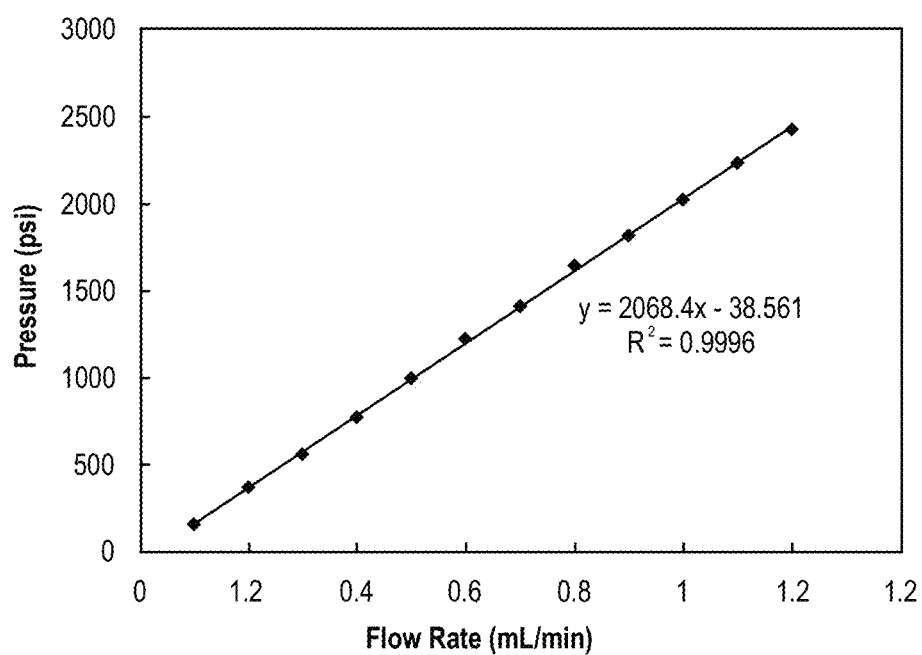
FIG. 11 is a graph showing pressure versus flow characteristics for the tested cross-linked stationary phase.

For example, under the same conditions used with the non-cross-linked column (mobile phase and pressure), the last eluting peak, n-hexylbenzene, eluted about 1.5 minutes earlier. FIG. 10 shows the chromatogram of alkylbenzenes on the column packed with the cross-linked stationary phase. Peak 1 corresponds to benzene, peak 2 to ethylbenzene, peak 3 to n-butylbenzene, and peak 4 to n-hexylbenzene. There were also immediate indications that this cross-linked material would be stable over a longer period of time, as evidenced by an ability to increase and decrease repeatedly and reproducibly the mobile-phase velocity. A plot of the resulting linear relationship between pressure and flow is shown in FIG. 11.

To compare the hydrophobicity of the present materials to the hydrophobicity of other materials, log k was calculated for a series of alkylbenzenes: benzene, toluene, ethylbenzene, n-butylbenzene, and n-hexylbenzene, and then fit the data to the equation:

$$\log k = \alpha(CH_2)C_n + \beta(Ph) \quad (6)$$

where $\alpha(CH_2)$ and $\beta(Ph)$ are the retention increments for the methylene and phenyl groups respectively, and $C_n$ is the number of carbon atoms in the side chain of the alkyl benzene. The interaction of the stationary phase with the phenyl group will give the y-intercept and that with the methylene units will provide the slope. The value of $\alpha(CH_2)$ thus gives an indication of the hydrophobicity of a column.

One column (4 µm mean particle size, 30 mm×4.6 mm id. column, see FIG. 18C) that was used for many months prior to this test was evaluated and gave an $\alpha(CH_2)$ of 0.15 under 40:60 (0.1% TEA):ACN at 30° C. Another column (4 µm mean particle size, 50 mm×4.6 mm id. column) was tested at the beginning of its lifetime and gave an $\alpha(CH_2)$ of 0.19 under 55:45 H$_2$O:ACN at 60° C. This difference in $\alpha(CH_2)$ values is attributed to different mobile-phase conditions, column ages, and operating temperatures. These data were compared to data for a Spherisorb ODS-2 octadecyl-modified silica gel. From the retention factors of alkylbenzenes that were separated in a 20 mM sodium phosphate buffer (pH 7.0):ACN mobile phase (40:60 v/v) at 30° C. an $\alpha(CH_2)$ value of 0.17 was calculated. This comparison points to a substantial hydrophobic (RP) character for the materials.

Figure 12A:
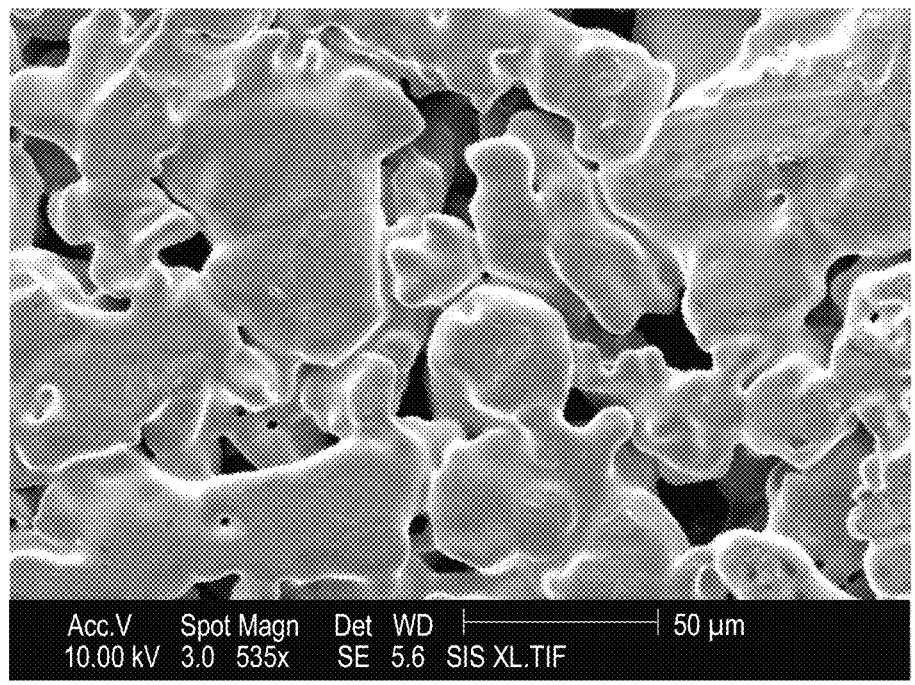
FIG. 12A is an SEM image showing an unused frit.
Figure 12B:
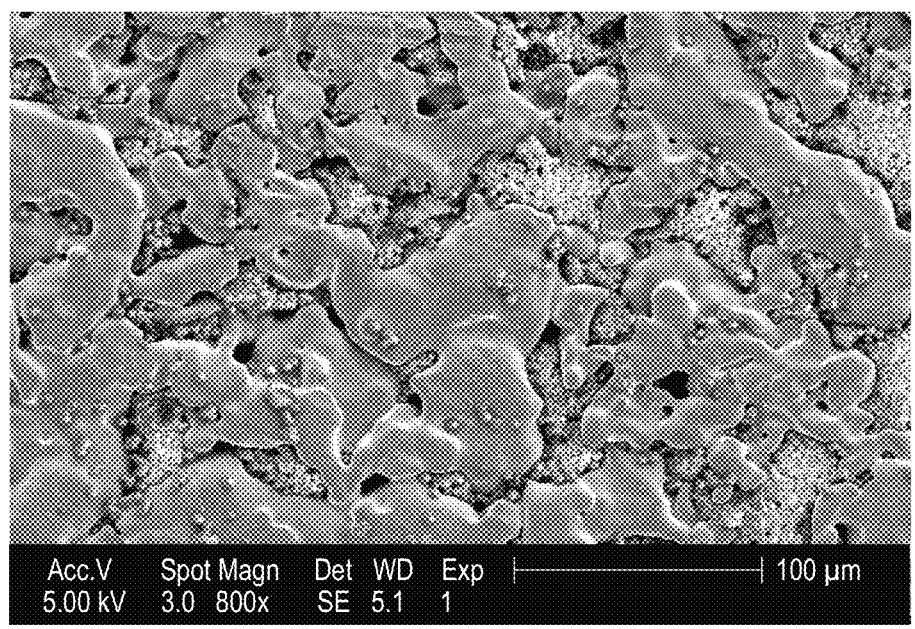
FIG. 12B is an SEM image showing a frit with particles in its pores, which frit was the back frit in the column, i.e., closest to the detector from the column with the broadest particle size distribution (i.e., corresponding to FIG. 18A)

As a further note of comparison, the initial back-pressure for the column containing the cross-linked phase was 940 psi, while the starting pressure for the column containing the non-cross-linked phase was 2040 psi. Both columns were packed under identical conditions. These results for the non-cross-linked particles suggest mechanical instability during packing, which would lead to clogging of the frit or the interstitial spaces between the particles by fines, possibly sloughed off the particles during column packing. However, even the back pressure from the column containing cross-linked material was higher than might be expected for a column containing 4 µm particles. To probe this issue, the back frit (closer to the detector) from one such column, which had been used extensively, was removed and analyzed by SEM. The resulting micrographs suggested plugging of the frit (FIGS. 12A and 12B). FIG. 12A shows the frit unused and FIG. 12B shows the frit clogged with particles. The data point to plugging resulting from fines that were not removed prior to packing, rather than damage to the particles during packing.

Figure 13:
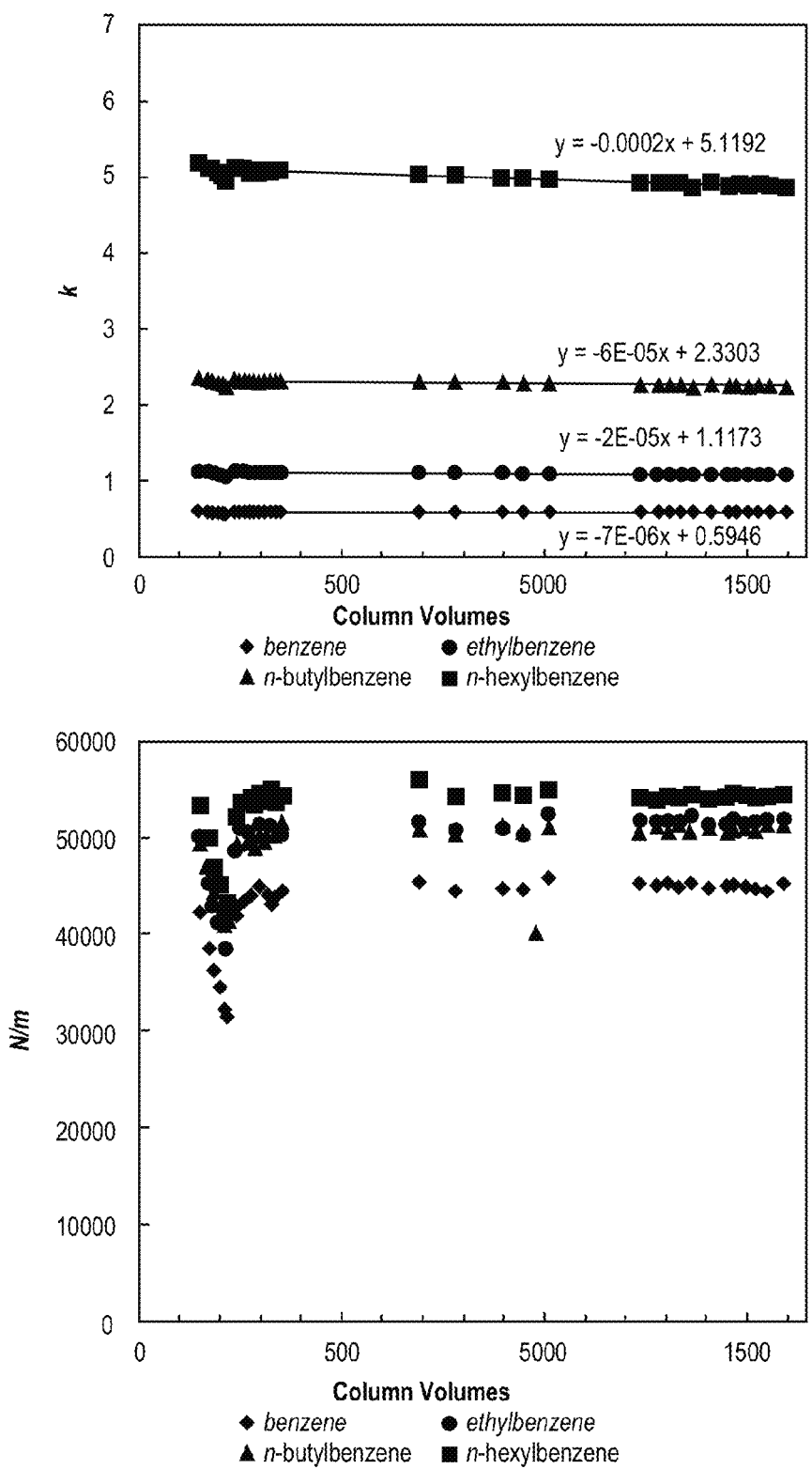
FIG. 13 shows column stability test results at a pH of 11.3 for various alkylbenzenes.

Stability at pH 11.3: The first stability test performed on the cross-linked column took place over 1600 column volumes of mobile phase at pH 11.3. The flow rate was 0.5 mL/min, and the column temperature was 35° C. An analyte mixture containing benzene, ethylbenzene, n-butylbenzene, and n-hexylbenzene was used to probe the column during this test. The trial ran over a 26.6 hr. period and resulted in a decrease in k of 4.2-6.1% (FIG. 13). The efficiency (N/m) of the column decreased initially; however, it recovered and over the length of the test there was no overall decrease in its efficiency (FIG. 13).

Figure 14:
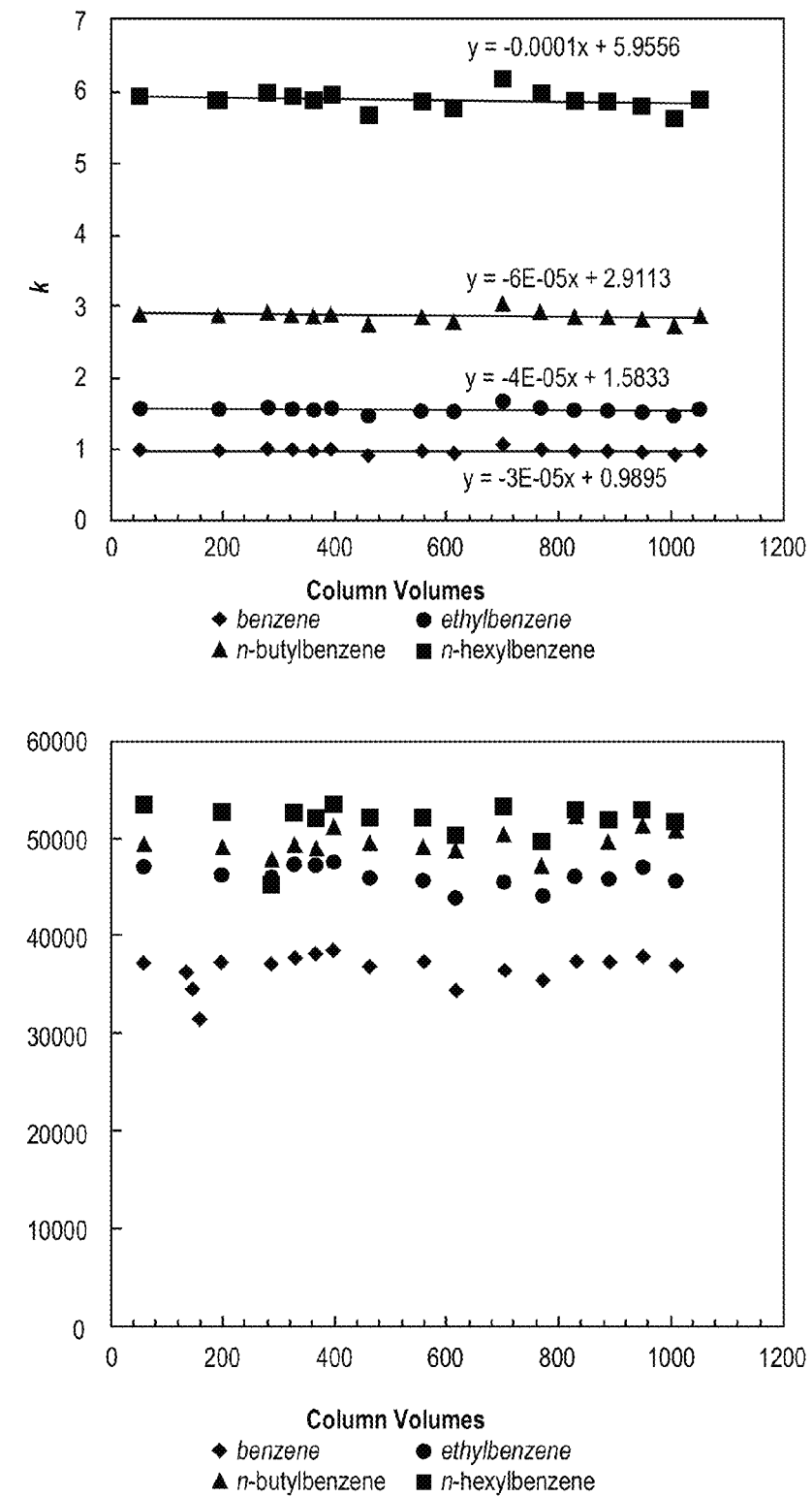
FIG. 14 shows column stability test results at a pH of 13.0 for various alkylbenzenes.

Stability at pH 13.0: A second stability test was then performed on this same column at pH 13.0 using the same analyte mixture (FIG. 14). The mobile phase was 40:60 H$_2$O:ACN with the aqueous portion set at pH 13.0 by addition of 1% (v/v) tetramethylammonium hydroxide solution. The flow rate for this stability test was 0.5 mL/min, and the column temperature was 35° C. Over the course of this stability test, only a slight decrease (about 1%) in k was seen. Given the scatter in the data, it was not possible to conclude whether the efficiencies of the columns increased or decreased; they remained nearly constant (e.g., ±3%).

Figure 15:
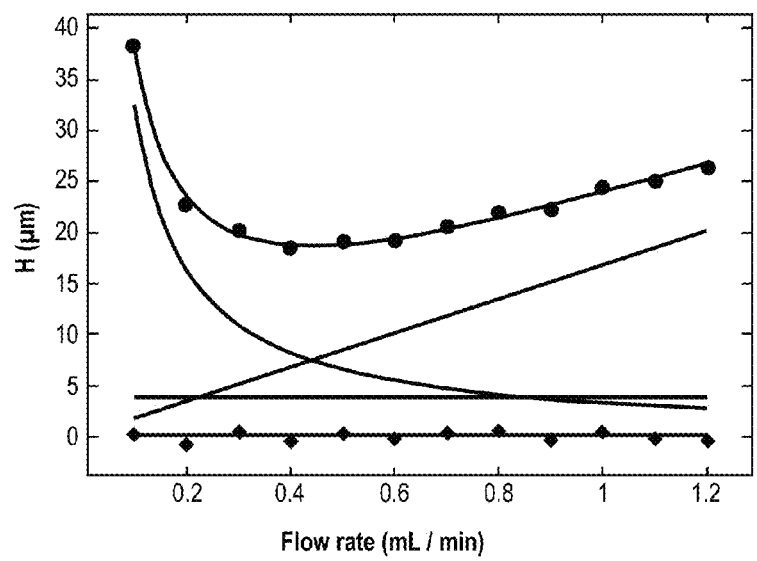
FIG. 15 shows a Van Deemter curve, as well as raw data, residuals, and fitted A, B, and C terms for n-butylbenzene.

Van Deemter Study and Instrument Response: The reasonable back-pressures of this column opened the possibility of varying flow rates enough to obtain van Deemter curves. For this study, the mobile phase was the same as that used for the first stability test (pH 11.3). An analyte mixture of benzene, ethylbenzene, n-propylbenzene, and n-butylbenzene was used, and measurements were taken every 0.1 mL/min from 0.1 to 12 mL/min. Table 2 below shows the results of this van Deemter study, and FIG. 15 shows a representative van Deemter curve for n-butylbenzene, the best performing analyte in this study. In FIG. 15, the raw data is shown by circles, with diamonds representing residuals to the data. The lines and curves between these data lines represent the fitted A, B, and C terms also shown in Table 2.

TABLE 2

Van Deemter Terms and Optima for Each Analyte

|  | A (µm) | B (µm * mL/ min) | C (µm * min/mL) | $R^2$ | flow rate$_{opt}$ (mL/ min) | $H_{opt}$ (µm) |
|---|---|---|---|---|---|---|
| benzene | 8.45 | 2.31 | 22.8 | 0.99955 | 0.32 | 23.0 |
| ethylbenzene | 6.36 | 2.62 | 18.8 | 0.99924 | 0.37 | 20.4 |
| n-propylbenzene | 5.71 | 2.74 | 17.4 | 0.99967 | 0.40 | 19.5 |
| n-butylbenzene | 3.89 | 3.25 | 16.8 | 0.99958 | 0.44 | 18.6 |

The optimal plate height and flow rate for n-butylbenzene from the fitted van Deemter data were 18.6 µm (which equates to about 53,800 N/m) and 0.44 mL/min. The best efficiency for a single injection of n-butylbenzene was 56,000 N/m at 0.5 mL/min. As shown by the data of Table 2, a trend in this van Deemter study was that the A and C terms decreased as the analytes increased in molecular weight. Also shown in Table 2 is that with increasing analyte molecular weight, the optimal mobile-phase flow rate increased. Furthermore, the improvements observed in efficiency with retention, which in the present case also corresponds to analyte molecular weight, are consistent with extra column contributions to band broadening. The HPLC system used in this work had a dead volume of about 100-105 µL, which was within the specifications for this instrument. However, for earlier eluting analytes on short columns, the LC appeared to contribute to decreased efficiencies.

Figure 16:
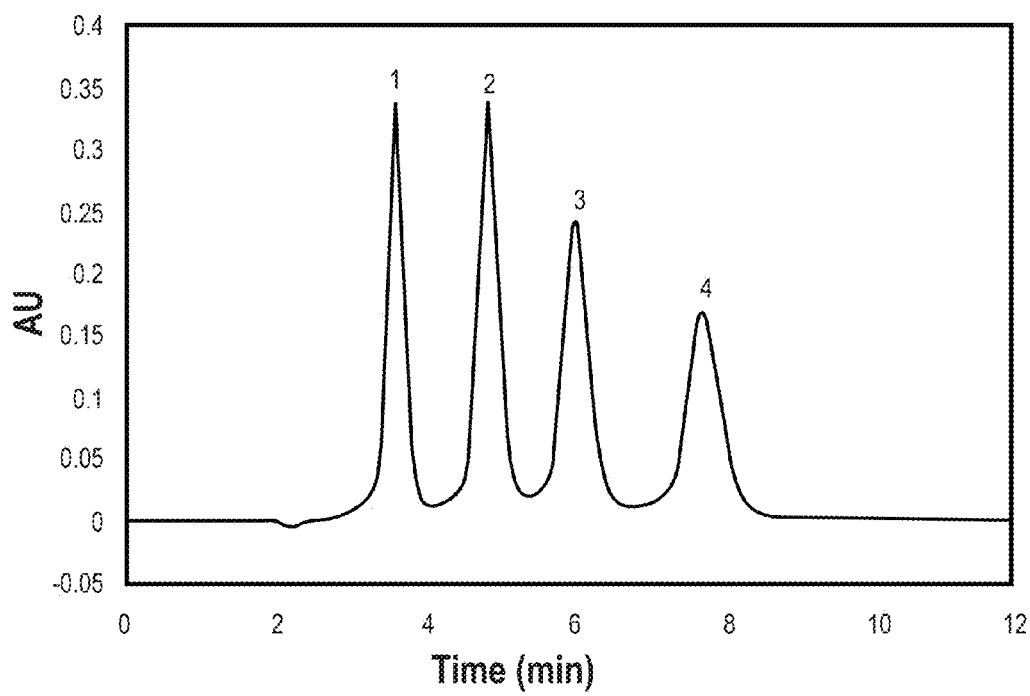
FIG. 16 is a graph showing reversed-phase separation of alkylbenzenes through an exemplary stationary phase at a flow rate of 0.5 mL/min.

The plate counts (N/m), which represent theoretical efficiencies, observed on this column are higher than those for phases previously created by the present inventors, despite previous phases having smaller particle sizes. The peaks also appear to have good asymmetries, although some of them show some fronting. Symmetry factors, which appeared to be low, were not calculated for the separations in the van Deemter study because the peaks were not fully baseline separated (FIG. 16).

Figure 17:
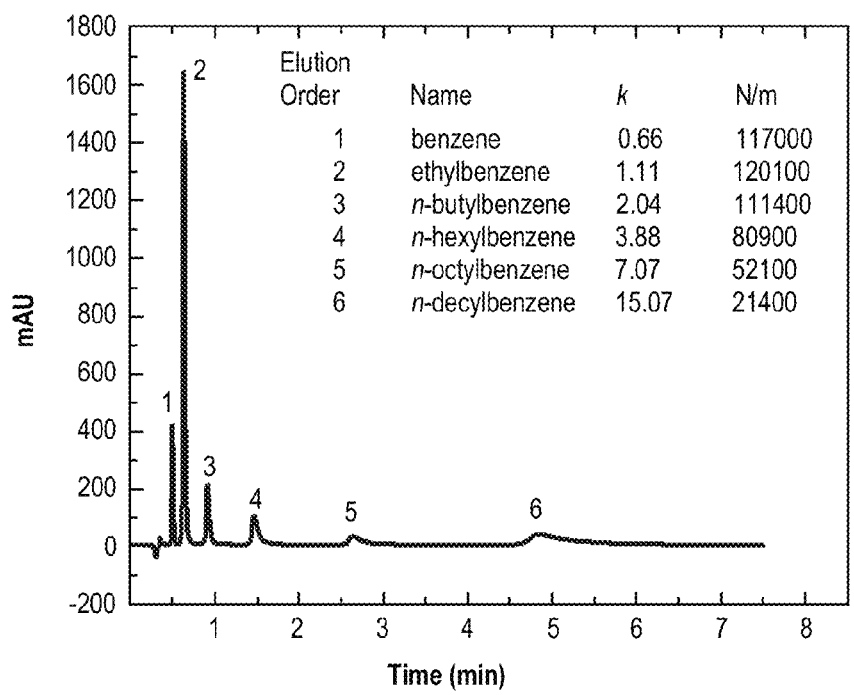
FIG. 17 is a graph showing separation of various alkylbenzenes on an Agilent Infinity 1290 using a sandwich injection.
Figure 19A:
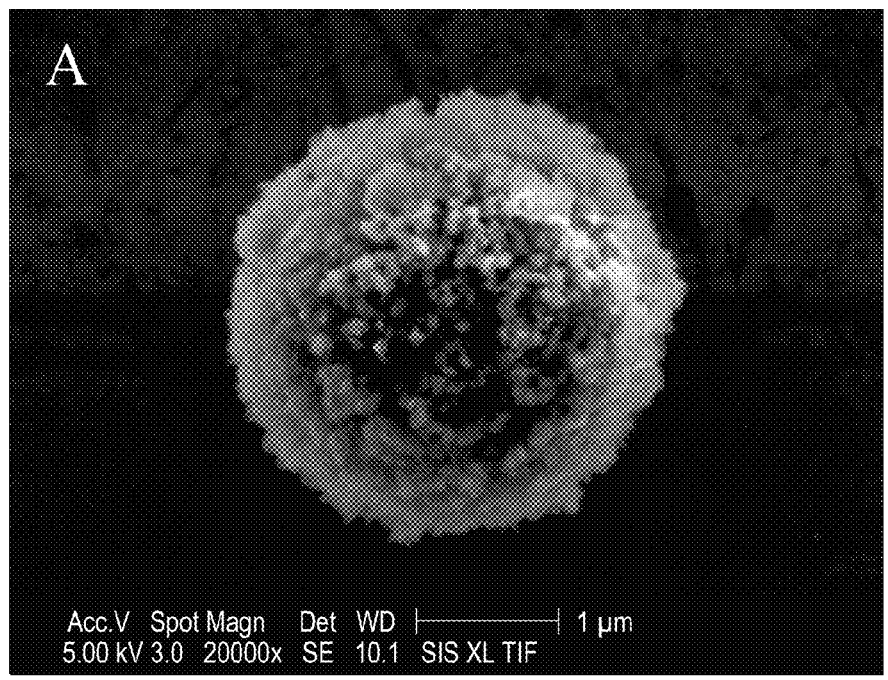
FIG. 19A is an SEM image of a single core-shell particle showing its high surface area and approximate spherical characteristics, with substantially even coating of PAAm/nano-diamond bilayers onto the carbon surface.
Figure 19B:
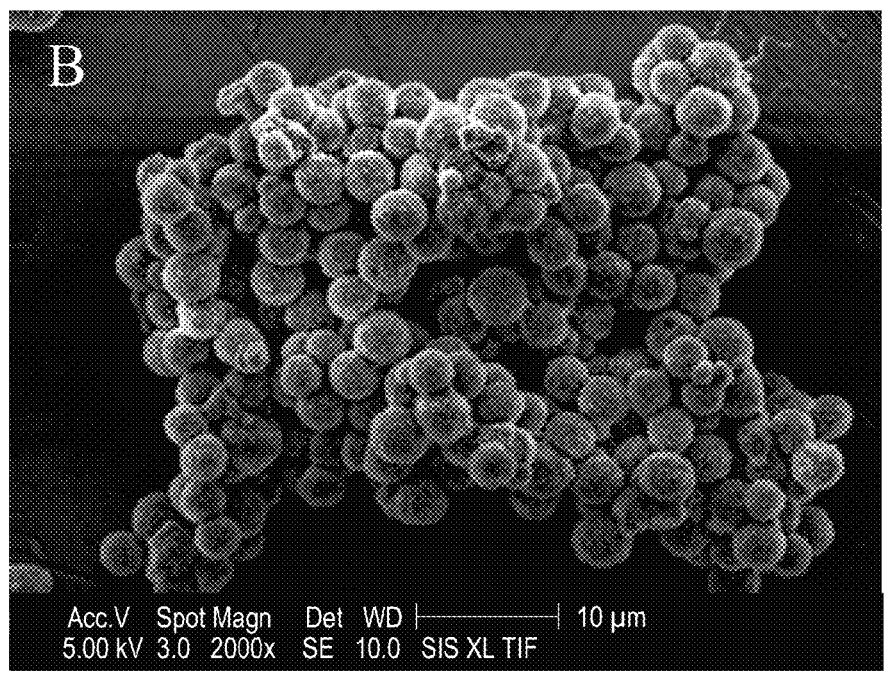
FIG. 19B is an SEM image of a large agglomerate of non-sonicated composite particulates.
Figure 19C:
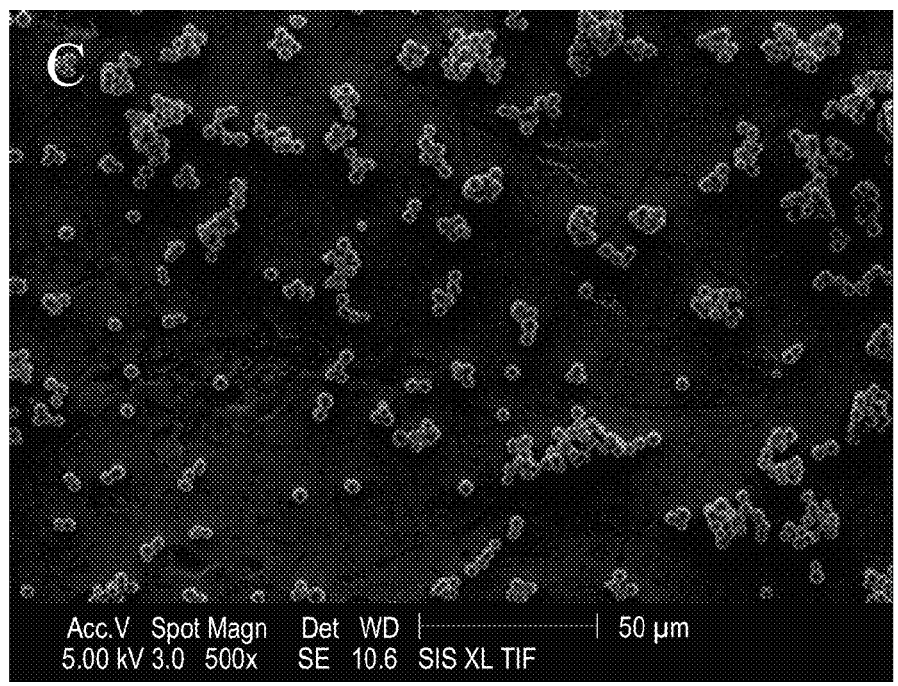
FIG. 19C is an SEM image showing non-sonicated composite particulates, showing that many of which are agglomerated.
Figure 19D:
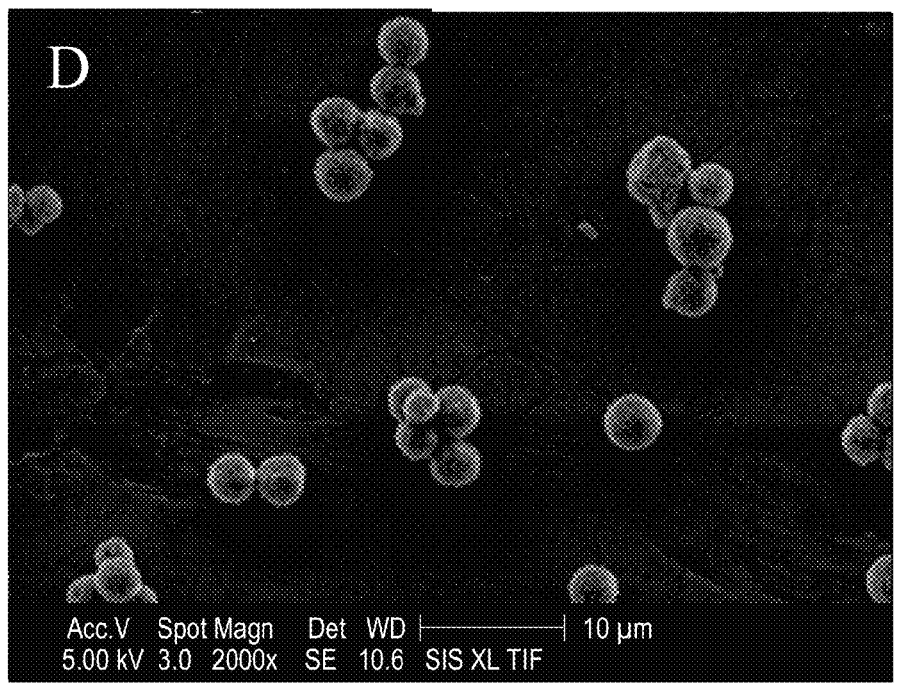
FIG. 19D is a closer up SEM image showing non-sonicated composite particulates, showing that many of which are agglomerated.
Figure 20A:
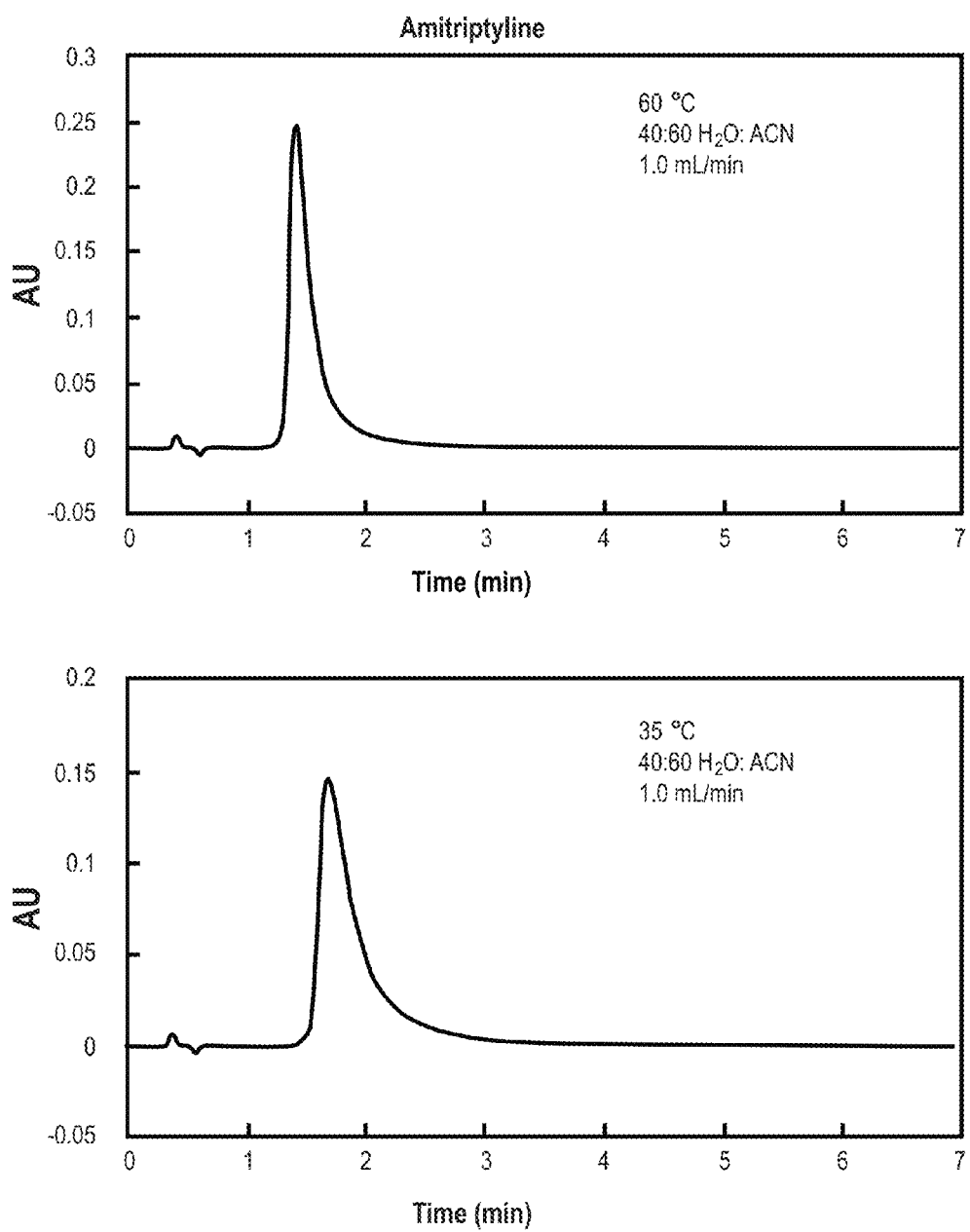
FIG. 20A shows graphs illustrating effects of column temperature on retention characteristics of amitriptylene using a mobile phase having a pH of 11.3.
Figure 20B:
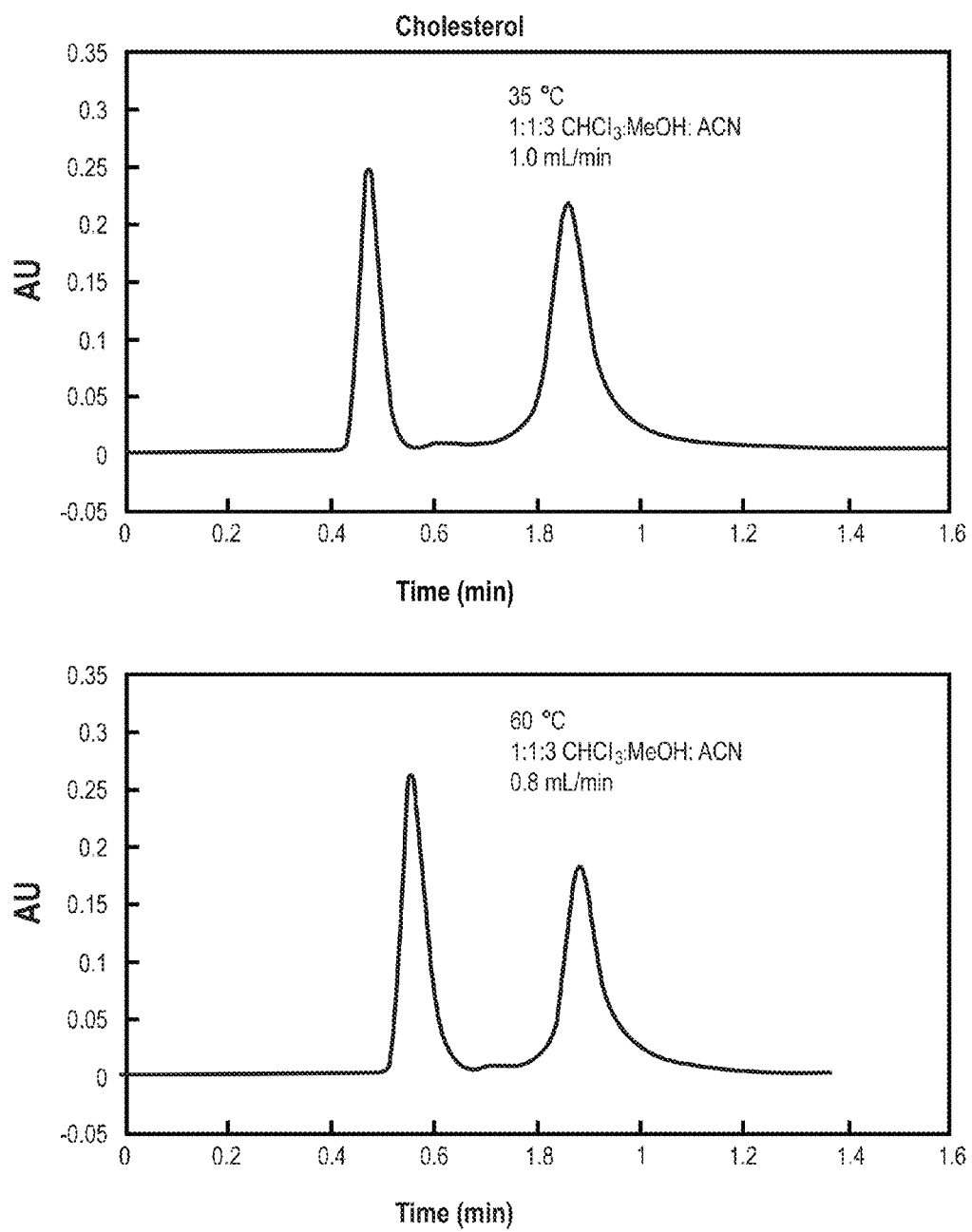
FIG. 20B shows graphs illustrating effects of column temperature on retention characteristics of cholesterol using a mobile phase having a pH of 11.3.
Figures 20C, 20D:
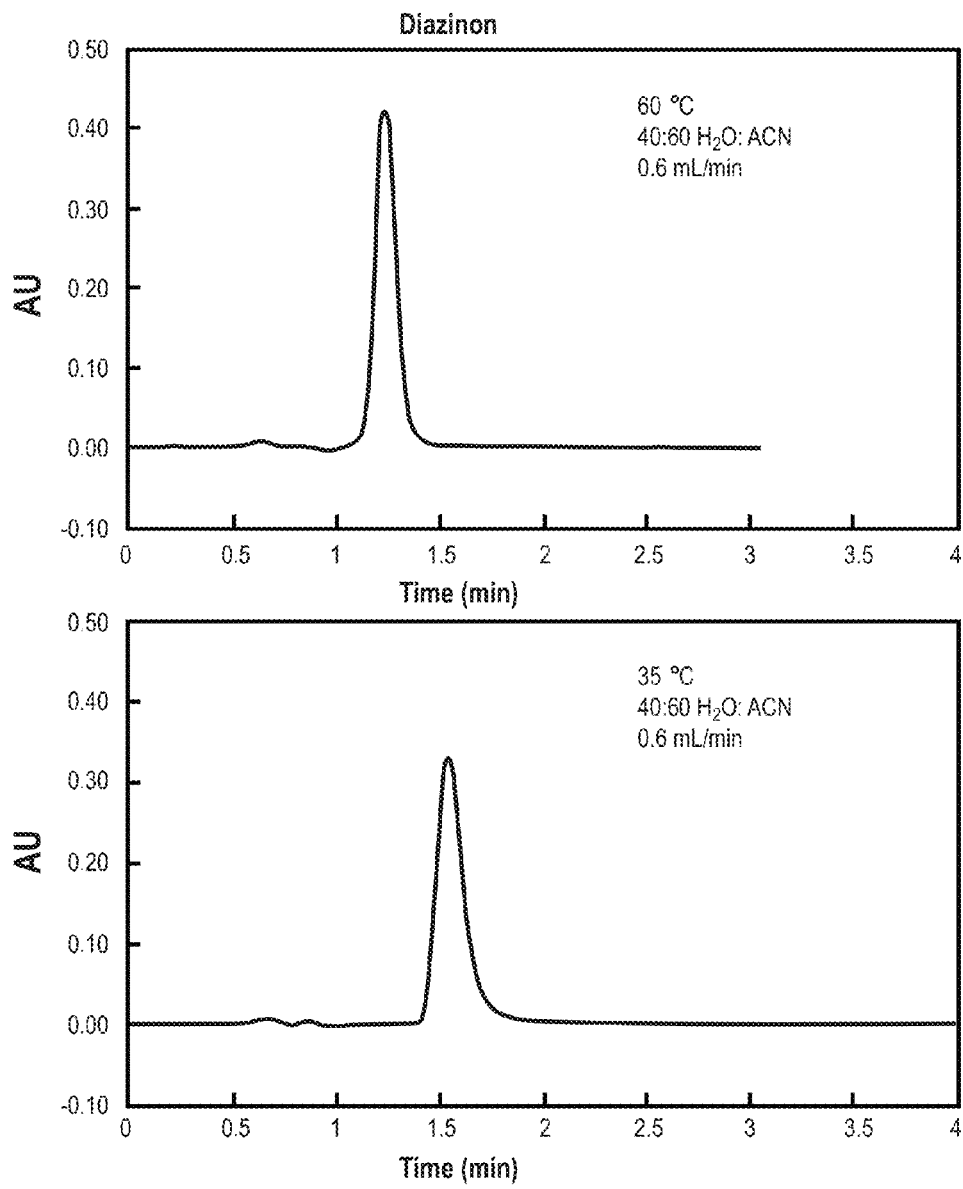
FIG. 20C shows graphs illustrating effects of column temperature on retention characteristics of diazinon using a mobile phase having a pH of 11.3.
FIG. 20D shows efficiency and asymmetry data associated with the graphs of FIGS. 20A-20C.

A "sandwich" injection of an alkylbenzene analyte mixture was done on a UHPLC system (Agilent Infinity 1290) with the pH 11.3 mobile phase used for the stability test in FIG. 13. The column used was the one corresponding to FIG. 18C. This UHPLC system was expected to have substantially lower extra column band broadening contributions than the HPLC system used for other separations by the present inventors. This separation, which was performed once, pointed to the potential efficiencies of diamond-based phases when used under more optimized conditions. In the resulting chromatogram (FIG. 17), benzene, ethylbenzene, n-butylbenzene, n-hexylbenzene, n-octylbenzene, and n-decylbenzene showed efficiencies of 117,000 N/m; 120,100 N/m; 111,400 N/m; 80,900 N/m; 52,100 N/m; and 21,400 N/m, respectively.

PSDs and SEMs of Particles and PSD Improvement: The reduced plate height, $h=H/d_p$, where $d_p$ is the average particle diameter, of a well-packed column of good particles is typically 2. Accordingly, higher than desired values of h (about 5 based on a projected particle size of 4 µm) were concerning. In addition, there was surprise that the C term had contributed so significantly to overall plate height because the stationary phase was based on a core-shell particle.

To obtain greater insight into these issues, the particles' size distribution ("PSD") was measured. Despite starting with a material having a 3 µm average particle size and a shell thickness of 0.5 µm (4 µm total), measurements showed a mean particle size of 14.0 µm and a $D_{90/10}$ (skewness) of 3.9 after functionalization. This less-than-ideal PSD is shown in FIG. 18A. The Van Deemter curves shown in FIGS. 18A-18C are for n-butylbenzene, and the data is presented in a similar manner as described relative to FIG. 15. Units for the A, B, and C terms are in µm, µm-mL/min, and µm-min/mL, respectively. Scanning electron microscopy also suggested the presence of agglomerates in this material (FIGS. 19A-19D).

In order to create a new batch of particles with the same cross-linked/$C_{18}$ functionality, but with fewer agglomerates sonication was employed. In this effort, the particles were sonicated after the first PAAm coating (before the first nano-diamond deposition). After sonication, a substantially improved PSD was obtained (FIG. 18B), and the mean $d_p$ of this batch was 5 µm. The column was characterized as before, and the resulting van Deemter curve showed the expected flattening of the C term. Where the C term for the previous particles was 16.8, the C term for the sonicated particles of FIG. 18B was 10.2. The A term for the sonicated material increased, which suggests that the packing procedure may be improved upon. The $d_{01}$, $d_{10}$, $d_{50}$, $d_{90}$, and $d_{99}$ values were 3.590 µm, 4.001 µm, 4.928 µm, 8.298 µm, and 13.20 µm, respectively.

A third batch of particles was then created, where sonication was employed after every PAAm deposition (i.e., 30 sonication steps). This batch showed an even better PSD, with a mean $d_p$ of 4 µm (FIG. 18C). The C term for these particles was even lower than before (4.84), and the A term remained high (17.0). The $d_{01}$, $d_{10}$, $d_{50}$, $d_{90}$, and $d_{99}$ values were 0.279 µm, 3.076 µm, 3.901 µm, 5.015 µm, and 7.160 µm, respectively. A reduction in the A term could likely be achieved through improving the packing procedure.

Retention and Separation of Various Analytes

Retention of Amitriptyline, Cholesterol, and Diazinon at pH 11.3: Diazinon (a pesticide), amitriptyline (a basic drug), and cholesterol (a lipid) were retained on the column corresponding to FIG. 18B. Better efficiencies and decreased asymmetries were seen at 60° C. as compared to 35° C. (FIGS. 20A-20D).

Retention of Amitriptyline and Three Organic Acids under Acidic Conditions: Under acidic conditions (40:60 0.1% formic acid:ACN) different retention mechanisms were seen for amitriptyline and various organic, aromatic acids. Amitriptyline was unretained at 35° C. and 60° C. It is believed that ion repulsion was occurring between amitriptyline and the stationary phase, which interaction overrode the hydrophobic character of the stationary phase.

Retention of toluic, benzoic, and p-chlorobenzoic acids was seen using a 100% methanol mobile phase containing 0.5 mM formic acid. Analytes exhibited substantial tailing. Table 3 below shows this trend. Retention increases with decreasing $pK_a$ (increased acidity) of analyte, consistent with an ion exchange interaction between the stationary phase and analytes.

TABLE 3

Retention of Various Benzoic Acids

| acid | $t_r$ (min) | $Asym_{10\%}$ | pKa |
|---|---|---|---|
| toluic acid | 3.74 | 3.02 | 4.37 |
| benzoic acid | 4.90 | 2.73 | 4.20 |
| p-chlorobenzoic | 12.56 | 2.74 | 3.99 |

Figure 21:
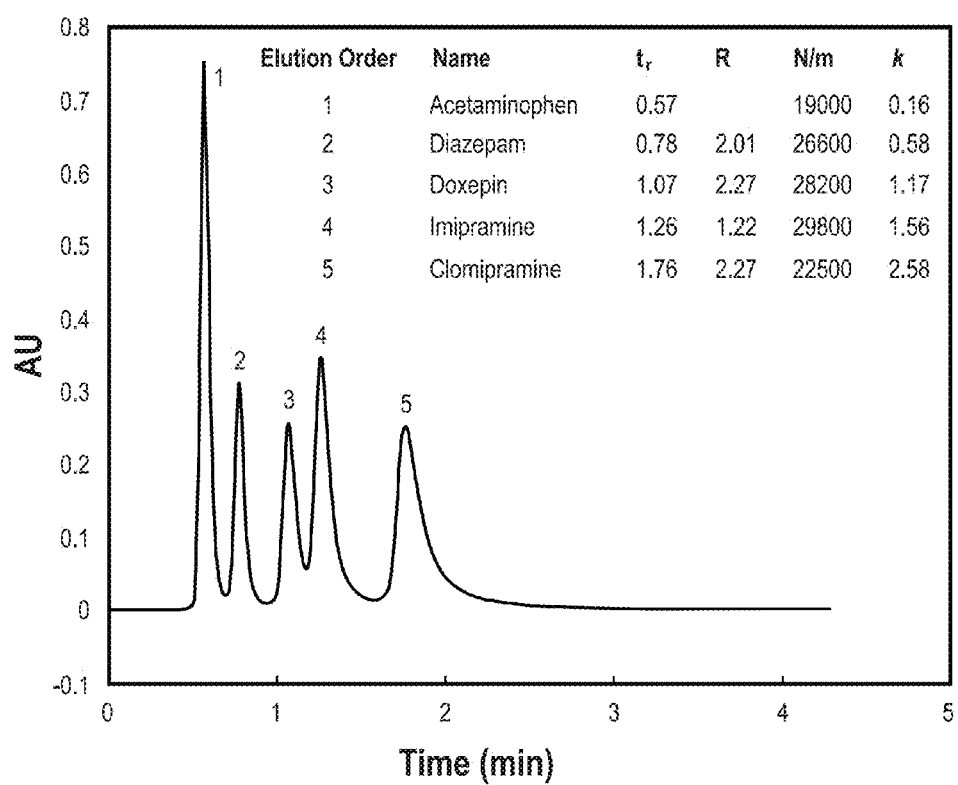
FIG. 21 shows separation results of five pharmaceuticals.

Separation of a Five-Component Pharmaceutical Mixture: A mixture of drugs, which included acetaminophen (TYLENOL), diazepam (VALIUM), doxepin (ADAPIN), imipramine (TOFRANIL), and clomipramine (ANAFRANIL), was separated at pH 11.3 using the third column ($d_p$=4 µm, FIG. 18C) at 60° C. with a flow rate of 0.8 mL/min using a basic mobile phase of 40:60 $H_2O$ (0.1% TEA, pH 11.3):ACN (FIG. 21). Some tailing was observed. It is believed that hydrogen bond acceptance and/or polar bonds of these basic analytes lead to interactions with the polar groups on the stationary phase, i.e., amine or hydroxyl groups. It is also possible that some of the nano-diamond surfaces may not be completely coated and any oxygenated moieties on those heterogeneous surfaces could also contribute to tailing of more polar analytes.

Figure 22A:
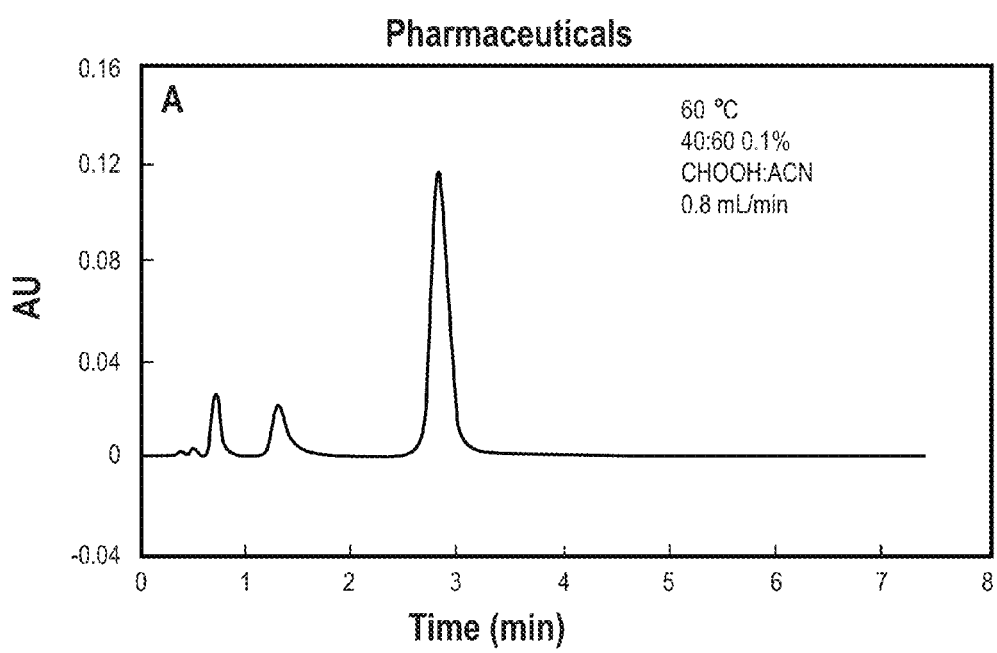
FIG. 22A is a graph and table showing separation of a mixture of pharmaceuticals under an acidic pH of 2.7.
Figure 22B:
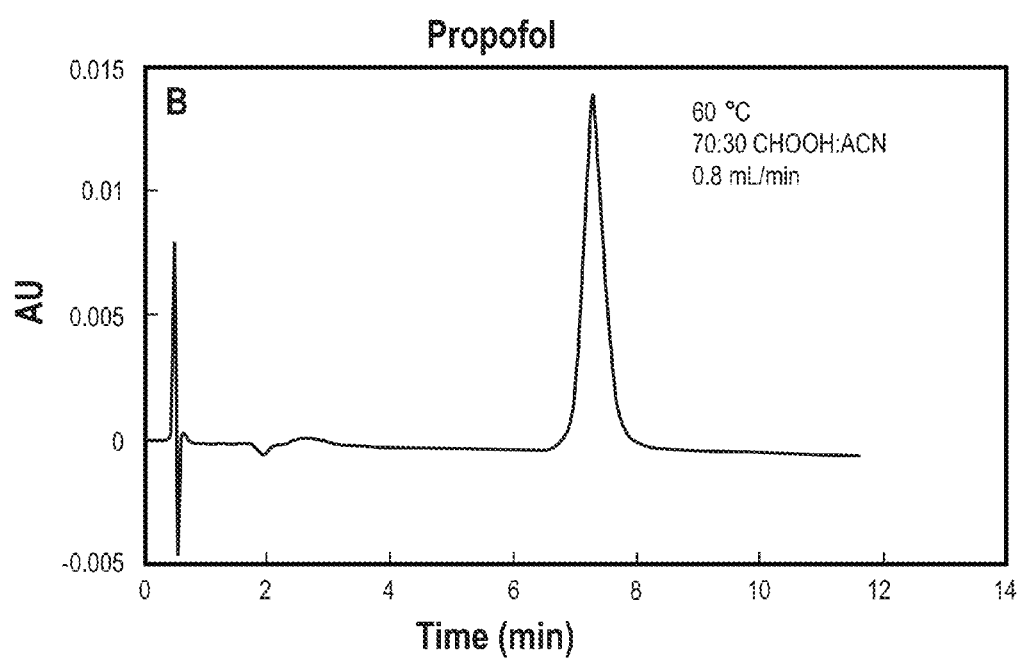
FIG. 22B is a graph and table showing retention of PROPOFOL.

Separation of a Three-Component Pharmaceutical Mixture at pH 2.7: Separations at low pH were also attempted on the third column ($d_p$=4 µm, FIG. 18C), where the first group of analytes was acetaminophen, diazepam, and 2,6-diisopropylphenol (PROPOFOL) (FIGS. 22A and 22B).

The mobile phase was 40:60 H$_2$O (0.1% formic acid, pH 2.7):ACN. While acetaminophen and diazepam were retained longer than in the basic separation, their efficiencies were lower. PROPOFOL show higher efficiencies (48,300 N/m) than seen with the other non-alkylbenzene analytes, and the peak symmetry was very good. This led us to attempt a separation of various phenols at acidic pH.

Figure 22C:
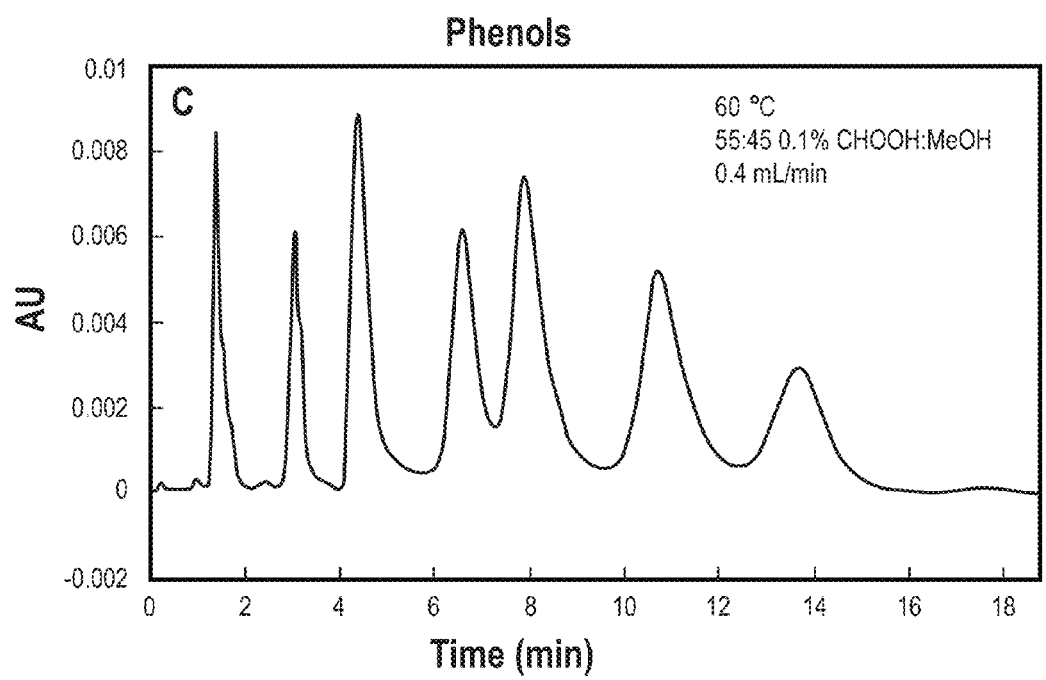
FIG. 22C is a graph and table showing separation of a mixture of phenols separated.

Separation of Phenolic Compounds and Derivatives at pH 2.7: Six phenolic compounds were separated using a mobile phase of 55:45 H$_2$O (0.1% formic acid pH 2.7):ACN (FIG. 22C). All of these analytes separated with an efficiency of about 13,500 N/m or better. The less than optimal efficiencies could be attributed to the core-shell particles being packed into the column twice. The separation showed fairly good resolution between the isomers 2-chlorophenol and 4-chlorophenol. A trend that seemed apparent from this separation was that electron withdrawing groups appear to cause greater tailing. This may be a result of an exposed diamond surface that retains the more deshielded aromatic ring. Peak asymmetries were not determined for this separation because most of the compounds were not baseline separated.

Retention of PROPOFOL: Again, PROPOFOL was separated, using a 70:30 H$_2$O (0.1% formic acid, pH 2.7):ACN mobile phase. The greater retention for this compound can be explained by the increased water in the mobile phase, resulting in a plate count of 71,500 N/m and a peak asymmetry of 1.12.

No signs of degradation of the stationary phase were observed at low pH, which might have been evidenced by an increase or significant decrease in back-pressure, or by a noticeable loss of performance. It would appear that cross-linking of the PAAm prevents any substantial swelling of the particles.

While various aspects and embodiments have been disclosed herein, other aspects and embodiments are contemplated. The various aspects and embodiments disclosed herein are for purposes of illustration and are not intended to be limiting. Additionally, the words "including," "having," and variants thereof (e.g., "includes" and "has") as used herein, including the claims, shall be open ended and have the same meaning as the word "comprising" and variants thereof (e.g., "comprise" and "comprises").

What is claimed is:

1. A method for manufacturing a porous composite particulate material, comprising:
   providing a plurality of acid-base-resistant core particles and a plurality of acid-base-resistant shell particles;
   applying at least one polymer material/shell particle bilayer comprising:
      coating at least a portion of the plurality of acid-base-resistant core particles, at least a portion of the plurality of acid-base-resistant shell particles, or combinations thereof with polymer material;
      adhering a portion of the plurality of acid-base-resistant shell particles to each of the plurality of acid-base-resistant core particles with the polymer material to form a plurality of composite particles, wherein at least a portion of the plurality of acid-base-resistant core particles comprises at least one member selected from the group consisting of diamond, graphitic carbon, glassy carbon, silicon carbide, boron nitride, tungsten carbide, niobium carbide, zirconia, noble metals, acid-base-stable highly cross-linked polymers, titania, alumina, and thoria; and
   applying sonic energy to the core particles during application of the at least one polymer material/shell particle bilayer to narrow a particle size distribution of the resulting composite particulate material than otherwise would be produced absent application of the sonic energy.

2. The method of claim 1 wherein applying at least one polymer material/shell particle bilayer comprises forming a plurality of polymer material/shell particle bilayers in separate layer-by-layer steps.

3. The method of claim 2 wherein from 5 to 100 of the plurality of polymer material/shell particle bilayers are formed.

4. The method of claim 2 wherein from 10 to 50 of the plurality of polymer material/shell particle bilayers are formed.

5. The method of claim 1 wherein at least a portion of the plurality of acid-base-resistant core particles comprise glassy carbon and the shell particles comprise nano-sized diamond.

6. The method of claim 1 wherein the plurality of composite particles exhibits a particle size of at least about 0.5 μm and a surface area of at least about 5.0 m$^2$/g.

7. The method of claim 1 wherein the plurality of acid-base-resistant core particles exhibits a particle size of at least an order of magnitude larger than the plurality of acid-base-resistant shell particles.

8. The method of claim 1 wherein the polymer material is coated on the core particles before adhering the shell particles to the core particles.

9. The method of claim 1 wherein the polymer material is coated on the acid-base-resistant shell particles before adhering the shell particles to the core particles.

10. The method of claim 1 wherein the sonic energy is applied after coating the polymer material on the core particles and prior to adhering the shell particles of any given bilayer.

11. The method of claim 1 wherein the sonic energy is applied during application of each bilayer.

12. The method of claim 1 wherein the sonic energy is applied during application of any given bilayer in a plurality of discontinuous intervals.

13. The method of claim 11 wherein a total sonication time associated with application of any given bilayer is about 1 minute to about 20 minutes, and wherein each interval is about 5% to about 50% of the total sonication time.

14. The method of claim 11 wherein a total sonication time associated with application of any given bilayer is about 2 minutes to about 10 minutes, and wherein each interval is about 10% to about 30% of the total sonication time.

15. The method of claim 11 wherein a total sonication time associated with application of any given bilayer is about 3 minutes to about 7 minutes, and wherein each interval is about 15% to about 25% of the total sonication time.

16. The method of claim 1, further comprising at least partially cross-linking the polymeric material.

17. A method for manufacturing a porous composite particulate material, comprising:
   providing a plurality of acid-base-resistant generally spherical core particles and a plurality of acid-base-resistant shell particles;
   applying at least one polymer material/shell particle bilayer comprising:
      coating at least a portion of the plurality of acid-base-resistant core particles, at least a portion of the plurality of acid-base-resistant shell particles, or combinations thereof with polymer material;
      adhering a portion of the plurality of acid-base-resistant shell particles to each of the plurality of acid-base-resistant core particles with the polymer material to form a plurality of composite particles wherein at least a portion of the plurality of acid-base-resistant core particles comprises at least one member selected from the group consisting of diamond, graphitic carbon, glassy carbon, silicon carbide, boron nitride, tungsten carbide, niobium carbide, zirconia, noble metals, acid-base-stable highly cross-linked polymers, titania, alumina, and thoria;

at least partially cross-linking the polymeric material; and applying sonic energy to the core particles during application of the at least one polymer material/shell particle bilayer to reduce a particle size distribution of the resulting composite particulate material than otherwise would be produced absent application of the sonic energy.

\* \* \* \* \*